(12) United States Patent
Pontual et al.

(10) Patent No.: US 9,800,929 B2
(45) Date of Patent: Oct. 24, 2017

(54) METHOD AND SYSTEM FOR OBTAINING VIEWING DATA AND PROVIDING CONTENT RECOMMENDATIONS AT A SET TOP BOX

(75) Inventors: Romulo Pontual, Palos Verdes Estates, CA (US); Sui-Ky Ringo Ling, Rancho Palos Verdes, CA (US); Raynold M. Kahn, Los Angeles, CA (US); Robert G. Arsenault, Redondo Beach, CA (US); Gordon H. Chen, Manhattan Beach, CA (US); Luke J. Crook, Torrance, CA (US); Jean Dumouchel, Beverly Hills, CA (US); Hugh Rothman, San Diego, CA (US); Brad Rice, Carlsbad, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 256 days.

(21) Appl. No.: 13/529,040

(22) Filed: Jun. 21, 2012

(65) Prior Publication Data
US 2012/0331494 A1    Dec. 27, 2012

Related U.S. Application Data

(60) Provisional application No. 61/500,855, filed on Jun. 24, 2011.

(51) Int. Cl.
*G06F 3/00* (2006.01)
*H04H 60/33* (2008.01)
(Continued)

(52) U.S. Cl.
CPC ....... *H04N 21/44222* (2013.01); *H04N 21/45* (2013.01); *H04N 21/4668* (2013.01); *H04N 21/8456* (2013.01)

(58) Field of Classification Search
None
See application file for complete search history.

(56) References Cited

U.S. PATENT DOCUMENTS 5,594,509 A    1/1997    Florin et al.
5,831,664 A    11/1998   Wharton et al.
(Continued)

FOREIGN PATENT DOCUMENTS

EP    0710017 A2    5/1996
EP    1471690 A2    10/2004
(Continued)

OTHER PUBLICATIONS

Invitation to Pay Additional Fees and, Where Applicable, Protest Fee and Communication Relating to the Results of the Partial International Search dated Jul. 26, 2012 in International Application No. PCT/US2012/041415 filed Jun. 7, 2012 by Romulo Pontual et al.

(Continued)

*Primary Examiner* — Jason K Lin
(74) *Attorney, Agent, or Firm* — Harness, Dickey & Pierce, PLC

(57) ABSTRACT

A system and method for generating television recommendations includes a viewer tracking module that tracks viewer events to form a viewer tracking log. A recommendation module that determines a timeslot, generates a timeslot viewing profile based on the timeslot. The viewer tracking log corresponds to television programs watched previously at the user device during the timeslot. The recommendation module compares the timeslot viewing profile with available content for the timeslot and generates a content recommendation list.

87 Claims, 20 Drawing Sheets

(51) Int. Cl.
  *H04N 21/442* (2011.01)
  *H04N 21/45* (2011.01)
  *H04N 21/466* (2011.01)
  *H04N 21/845* (2011.01)

(56) References Cited

U.S. PATENT DOCUMENTS

| | | | |
|---|---|---|---|
| 5,983,214 | A | 11/1999 | Lang et al. |
| 6,526,581 | B1 | 2/2003 | Edson |
| 6,882,299 | B1 | 4/2005 | Allport |
| 6,970,127 | B2 | 11/2005 | Rakib |
| 6,990,635 | B2 | 1/2006 | Kurapati et al. |
| 7,093,273 | B2 | 8/2006 | Marsh |
| 7,254,829 | B1 | 8/2007 | Brown et al. |
| 7,571,452 | B2 | 8/2009 | Gutta |
| 7,581,237 | B1 | 8/2009 | Kurapati |
| 7,895,625 | B1 | 2/2011 | Bryan et al. |
| 8,082,572 | B1 | 12/2011 | Tilford |
| 8,607,284 | B2 | 12/2013 | Li et al. |
| 2001/0039520 | A1 | 11/2001 | Nakade et al. |
| 2002/0056112 | A1 | 5/2002 | Dureau et al. |
| 2002/0078172 | A1 | 6/2002 | Yoshikai et al. |
| 2002/0083459 | A1 | 6/2002 | Kondo et al. |
| 2002/0104087 | A1 | 8/2002 | Schaffer et al. |
| 2002/0154888 | A1 | 10/2002 | Allen et al. |
| 2002/0174429 | A1 | 11/2002 | Gutta et al. |
| 2003/0084448 | A1* | 5/2003 | Soundararajan ............... 725/46 |
| 2003/0220830 | A1 | 11/2003 | Myr |
| 2003/0233650 | A1 | 12/2003 | Zaner et al. |
| 2003/0237093 | A1 | 12/2003 | Marsh |
| 2004/0006698 | A1 | 1/2004 | Apfelbaum |
| 2004/0221310 | A1* | 11/2004 | Herrington ........ H04N 5/44543 725/46 |
| 2004/0244029 | A1 | 12/2004 | Gross |
| 2004/0255326 | A1 | 12/2004 | Hicks et al. |
| 2005/0050578 | A1 | 3/2005 | Ryal |
| 2005/0055640 | A1 | 3/2005 | Alten |
| 2005/0099493 | A1 | 5/2005 | Chew |
| 2005/0186988 | A1 | 8/2005 | Lim et al. |
| 2005/0204392 | A1 | 9/2005 | Na |
| 2005/0278737 | A1 | 12/2005 | Ma et al. |
| 2006/0085835 | A1 | 4/2006 | Istvan et al. |
| 2006/0101338 | A1 | 5/2006 | Kates |
| 2006/0294548 | A1 | 12/2006 | Potrebic et al. |
| 2007/0157249 | A1* | 7/2007 | Cordray et al. ............... 725/58 |
| 2007/0169148 | A1 | 7/2007 | Oddo et al. |
| 2007/0186241 | A1* | 8/2007 | Sugimoto et al. ............ 725/46 |
| 2007/0186243 | A1 | 8/2007 | Pettit et al. |
| 2007/0220554 | A1 | 9/2007 | Barton et al. |
| 2008/0066011 | A1 | 3/2008 | Urrabazo et al. |
| 2008/0077852 | A1 | 3/2008 | Fleishman et al. |
| 2008/0092169 | A1* | 4/2008 | Shannon et al. ............... 725/46 |
| 2008/0109866 | A1 | 5/2008 | Thomas et al. |
| 2008/0120656 | A1 | 5/2008 | Jupin |
| 2008/0127253 | A1 | 5/2008 | Zhang et al. |
| 2009/0100478 | A1* | 4/2009 | Craner et al. ................. 725/87 |
| 2009/0133059 | A1 | 5/2009 | Gibbs et al. |
| 2009/0158342 | A1 | 6/2009 | Mercer et al. |
| 2009/0165054 | A1* | 6/2009 | Rudolph ............ H04N 5/44543 725/46 |
| 2009/0178081 | A1 | 7/2009 | Goldenberg et al. |
| 2009/0199283 | A1 | 8/2009 | Jain |
| 2009/0202218 | A1* | 8/2009 | Inatomi et al. ................. 386/52 |
| 2009/0217332 | A1 | 8/2009 | Hindle et al. |
| 2009/0262661 | A1 | 10/2009 | Ueda et al. |
| 2010/0046931 | A1* | 2/2010 | Takao et al. ................... 386/124 |
| 2010/0064325 | A1 | 3/2010 | Fishman et al. |
| 2010/0162335 | A1 | 6/2010 | Davis |
| 2010/0205628 | A1 | 8/2010 | Davis et al. |
| 2010/0251305 | A1* | 9/2010 | Kimble et al. ................. 725/46 |
| 2010/0333142 | A1 | 12/2010 | Busse et al. |
| 2011/0090402 | A1 | 4/2011 | Huntington et al. |
| 2011/0184899 | A1* | 7/2011 | Gadanho et al. ............... 706/46 |
| 2011/0214148 | A1* | 9/2011 | Gossweiler et al. ........... 725/46 |
| 2012/0011550 | A1 | 1/2012 | Holland |
| 2012/0078937 | A1 | 3/2012 | Hall |
| 2012/0089923 | A1 | 4/2012 | Pettit et al. |
| 2012/0096503 | A1 | 4/2012 | Slothouber et al. |
| 2012/0117017 | A1* | 5/2012 | Phillips et al. ................. 706/50 |
| 2012/0174155 | A1 | 7/2012 | Mowrey et al. |
| 2012/0174158 | A1 | 7/2012 | Mowrey et al. |
| 2012/0284749 | A1* | 11/2012 | Lee ...................... H04N 21/235 725/39 |
| 2012/0303138 | A1 | 11/2012 | Demskie |
| 2013/0326552 | A1 | 12/2013 | Adams |
| 2013/0326563 | A1 | 12/2013 | Mulcahy et al. |
| 2014/0067961 | A1 | 3/2014 | Archibong et al. |
| 2014/0089982 | A1* | 3/2014 | Narahara et al. ............... 725/46 |
| 2014/0109139 | A1* | 4/2014 | Jeon et al. ..................... 725/40 |
| 2014/0245357 | A1* | 8/2014 | Huntington et al. ........... 725/52 |

FOREIGN PATENT DOCUMENTS

| | | | | |
|---|---|---|---|---|
| EP | 1921860 A2 | 5/2008 | | |
| EP | 2028850 A2 | 2/2009 | | |
| KR | WO 2011049337 A2 * | 4/2011 | ........... | H04N 21/235 |
| WO | 01/47248 A2 | 6/2001 | | |
| WO | 2004091187 A2 | 10/2004 | | |
| WO | 2008/042281 A2 | 4/2008 | | |

OTHER PUBLICATIONS

Non-final Office action dated Oct. 22, 2013 in U.S. Appl. No. 13/803,395, filed Mar. 14, 2013 by Romulo Pontual et al.
Non-final Office action dated Sep. 12, 2013 in U.S. Appl. No. 13/529,048, filed Jun. 21, 2012 by Sui-ky Ringo Ling et al.
International Search Report and Written Opinion dated Sep. 27, 2012 in International Application No. PCT/US2012/041415 filed by Romulo Pontual et al.
Final Rejection dated Mar. 12, 2014 in U.S. Appl. No. 13/529,048, filed Jun. 21, 2012 by Sui-Ky Ringo Ling et al.
Final Rejection dated Apr. 10, 2014 in U.S. Appl. No. 13/803,395, filed Mar. 14, 2013 by Romulo Pontual et al.
Non-final Office action dated Sep. 30, 2014 in U.S. Appl. No. 13/803,395, filed Mar. 14, 2013 by Romulo Pontual et al.
Final Rejection dated Mar. 30, 2015 in U.S. Appl. No. 13/803,395, filed Mar. 14, 2013 by Romulo Pontual et al.
Non-final Office action dated Nov. 19, 2015 in U.S. Appl. No. 13/803,516, filed Mar. 14, 2013 by Romulo Pontual et al.
Colombian Office action dated Jul. 2, 2015 in Colombian Patent Application No. 14-006.899 filed Jun. 7, 2012 by Romulo Pontual et al.
Final Rejection dated Jul. 23, 2015 in U.S. Appl. No. 13/529,048, filed Jun. 21, 2012 by Sui-Ky Ringo Ling et al.

* cited by examiner

| Event | Channel | Time Event Generated | Time In Event | Program |
|---|---|---|---|---|
| <Timeslot Begin> | A | - | - | P1 |
| Channel Change | B | 01:30 | 01:30 | - |
| Live TV Viewing | B | 0:200 | 01:30 | P2 |
| Channel Change | C | 06:00 | 06:00 | - |
| Channel Change | D | 06:20 | 06:20 | - |
| Channel Change | B | 06:45 | 06:45 | - |
| Live TV Viewing | B | 07:15 | 06:45 | P2 |
| Channel Change | A | 09:30 | 09:30 | - |
| Live TV Viewing | A | 10:00 | 09:30 | P1 |
| Channel Change | D | 15:30 | 15:30 | - |
| Live TV Viewing | D | 16:00 | 15:30 | P3 |
| Channel Change | B | 16:30 | 16:30 | - |
| Live TV Viewing | B | 17:00 | 16:30 | P2 |
| Live TV Viewing | B | 25:00 | 25:00 | P4 |

FIG. 6

| Program | Channel | Tune Start | Tune End | Tune Duration |
|---|---|---|---|---|
| P1 | A | (start of timeslot) | 01:30 | 1 min 30 sec |
| P2 | B | 01:30 | 06:00 | 4 min 30 sec |
| P2 | B | 06:45 | 09:30 | 2 min 45 sec |
| P1 | A | 09:30 | 15:30 | 6 min |
| P3 | D | 15:30 | 16:30 | 1 min |
| P2 | B | 16:30 | 25:00 | 8 min 30 sec |
| P4 | B | 25:00 | (end of timeslot) | 5 min |

FIG. 7

| Category Vectors | Action | Comedy | Cosine Similarity = T*C |
|---|---|---|---|
| Target T1 | 0.5 | 0.87 | cos(0) = 0.5^2 + 0.87^2 = 1 |
| Candidate C1 | 1/√2 | 1/√2 | cos(15) = 0.5+0.87/√2 = 0.97 |
| Candidate C2 | 0 | 1 | cos(30) = 0.87 |
| Candidate C3 | 1 | 0 | cos(60) = 0.5 |

| Category Index | Initial Weights | Adjusted Weights | Normalized Weights |
|---|---|---|---|
| 1 | 0.13 | 0.40 | 0.31 |
| 2 | 0.67 | 0.94 | 0.72 |
| 3 | 0.72 | 0.72 | 0.55 |
| 4 | 0.12 | 0.39 | 0.30 |

| Title | Content ID | Ch. | Date | Timeslot | Watched |
|---|---|---|---|---|---|
| Seinfield | 1 1 10 3 | 217 | 13 days ago | 07:00pm - 07:30pm | 12 minutes |
| Seinfield | 1 1 10 5 | 217 | 12 days ago | 07:00pm - 07:30pm | 19 minutes |
| NFL Football | 1 1 30 0 | 729 | 10 days ago | 10:00am - 10:30am | 23 minutes |
| NFL Football | 1 1 30 0 | 729 | 10 days ago | 10:30am - 11:00am | 28 minutes |
| NFL Football | 1 1 30 0 | 729 | 10 days ago | 11:00am - 11:30am | 27 minutes |
| NFL Football | 1 1 30 0 | 729 | 10 days ago | 11:30am - 12:00pm | 29 minutes |
| NFL Football | 1 1 30 0 | 729 | 10 days ago | 12:00pm - 12:30pm | 29 minutes |
| NFL Football | 1 1 30 0 | 729 | 10 days ago | 12:30pm - 1:00pm | 22 minutes |
| Lost | 1 1 45 2 | 710 | 8 days ago | 09:00pm - 09:30pm | 27 minutes |
| Lost | 1 1 45 2 | 710 | 8 days ago | 09:30pm - 10:00pm | 28 minutes |
| Evening News | 1 1 50 0 | 705 | 5 days ago | 07:00pm - 07:30pm | 14 minutes |
| Seinfield | 1 1 10 6 | 217 | 5 days ago | 07:00pm - 07:30pm | 10 minutes |
| Simpsons | 1 1 20 7 | 216 | 4 days ago | 07:00pm - 07:30pm | 27 minutes |
| Simpsons | 1 1 20 7 | 216 | 3 days ago | 07:00pm - 07:30pm | 18 minutes |
| Seinfield | 1 1 10 8 | 217 | 3 days ago | 07:00pm - 07:30pm | 11 minutes |
| Lost | 1 1 45 5 | 710 | 2 days ago | 09:00pm - 09:30pm | 29 minutes |
| Lost | 1 1 45 5 | 710 | 2 days ago | 09:30pm - 10:00pm | 26 minutes |
| Seinfield | 1 1 10 4 | 376 | Yesterday | 11:00pm - 11:30pm | 20 minutes |

FIG. 22

| Title | Content ID | Ch. | Date | Start Time | Duration |
|---|---|---|---|---|---|
| Simpsons | 1 1 20 8 | 215 | Today | 07:00 pm | 30 minutes |
| Futurama | 1 1 47 34 | 216 | Today | 07:00 pm | 30 minutes |
| Seinfeld | 1 1 10 9 | 217 | Today | 07:00 pm | 30 minutes |
| Psych | 1 1 80 0 | 710 | Today | 07:00 pm | 1 hour |
| Golf | 1 1 32 0 | 729 | Today | 06:00pm | 3 hours |
| Simpsons | 1 1 20 9 | 215 | Today | 07:30pm | 30 minutes |
| Futurama | 1 1 47 35 | 216 | Today | 07:30pm | 30 minutes |
| Nightly News | 1 1 80 0 | 217 | Today | 07:30pm | 30 minutes |
| House | 1 1 80 0 | 710 | Today | 08:00pm | 1 hour |
| Sportscenter | 1 1 58 0 | 729 | Today | 09:00pm | 1 hour |
| Family Guy | 1 1 46 17 | 306 | 3 days from now | 09:00pm | 30 minutes |

FIG. 23

| Title | Content ID | Ch. | Date | Start Time | Duration |
|---|---|---|---|---|---|
| Simpsons | 1 1 20 8 | 215 | Today | 07:00 pm | 30 minutes |
| Futurama | 1 1 47 34 | 216 | Today | 07:00 pm | 30 minutes |
| Seinfeld | 1 1 10 9 | 217 | Today | 07:00 pm | 30 minutes |
| Psych | 1 1 80 0 | 710 | Today | 07:00 pm | 1 hour |
| Golf | 1 1 32 0 | 729 | Today | 06:00pm | 3 hours |
| House | 1 1 81 0 | 710 | Today | 08:00pm | 1 hour |
| Sportscenter | 1 1 58 0 | 729 | Today | 09:00pm | 1 hour |
| Simpsons | 1 1 20 9 | 806 | Today | 07:30pm | 30 minutes |
| Family Guy | 1 1 46 17 | 306 | 3 days from now | 09:00pm | 30 minutes |

FIG. 24

METHOD AND SYSTEM FOR OBTAINING VIEWING DATA AND PROVIDING CONTENT RECOMMENDATIONS AT A SET TOP BOX

CROSS-REFERENCE TO RELATED APPLICATIONS

This application claims the benefit of U.S. Provisional Application No. 61/500,855, filed on Jun. 24, 2011. The entire disclosure of the above application is incorporated herein by reference.

TECHNICAL FIELD

The present disclosure relates generally to providing recommendations for content users, and, more specifically, to a method and system for obtaining viewing data and generating program recommendations in a content recommendation system.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and timeslots as well as programming information for each information timeslot. The programming information may include the content title and other identifiers such as actor information and the like.

Because the number of channels is so great, all of the channels cannot be simultaneously displayed on the screen display. A user can scroll up and down and sideways to see various portions of the program guide for different times and channels. Because of the large number of content titles, and timeslots and channels, is often difficult to decide on a program selection to view.

SUMMARY

The present disclosure provides a system and method for generating recommendations based upon viewing data from events at the user device and a recommendation algorithm.

In one aspect of the disclosure, a method includes determining a timeslot, tracking viewer events within a user device to form a viewer tracking log, generating a timeslot viewing profile based on the timeslot and viewer tracking log that corresponds to television programs watched previously at the user device during the timeslot, comparing the timeslot viewing profile with available content and generating a content recommendation list for the timeslot based on comparing.

In a further aspect of the disclosure, a system and method for generating television recommendations includes a viewer tracking module that tracks viewer events to form a viewer tracking log. A recommendation module that determines a timeslot, generates a timeslot viewing profile based on the timeslot viewing data. The viewer tracking log corresponds to television programs watched previously at the user device during the timeslot. The recommendation module compares the timeslot viewing profile with available content for the timeslot and generates a content recommendation list based after the recommendation module compares the timeslot viewing profile with available content.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a table of the channel tune events corresponding to the plot of FIG. 5.

FIG. 7 is a channel tune time calculation table having various tune times for the various programs.

FIG. 22 is a table for the set top box viewer tracker log.

FIG. 23 is the program guide data associated with the example for FIG. 22.

FIG. 24 is an example of program guide data for a new set top box.

DETAILED DESCRIPTION

Figure 1:
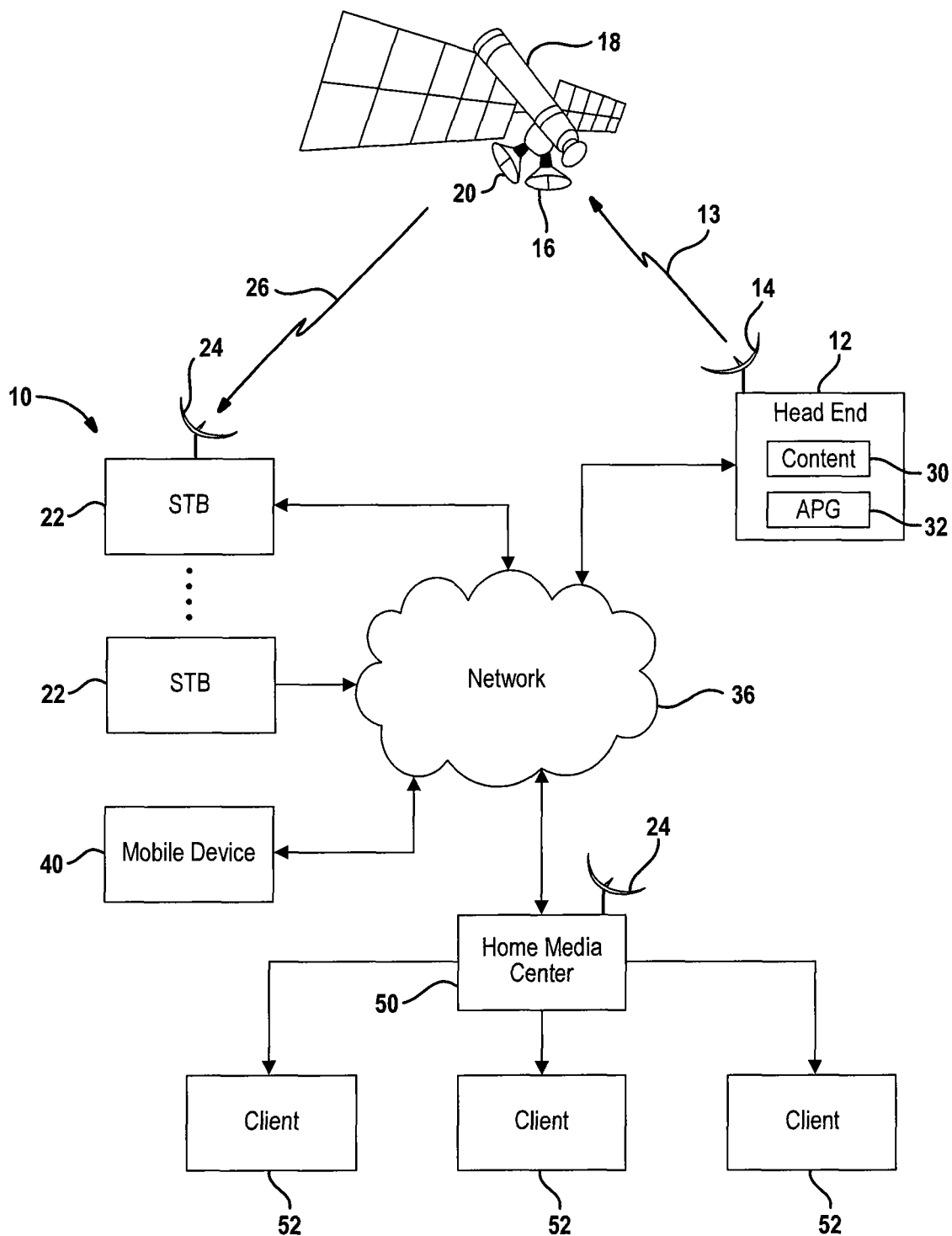
FIG. 1 is a high level block diagrammatic view of a recommendation system according to the present disclosure.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to programs, data, information, movies, assets, video data, etc., however, it will be readily apparent to persons of ordinary skill in the art that these terms are substantially equivalent in reference to the example systems and/or methods disclosed herein. As used herein, the term title or program will be used to refer to the movie or program name.

In the following examples, recommendations of titles of various programs are provided. The content recommendations may provide a title either graphically or alpha-numerically or a combination of both. Graphically, content posters or thumbnails may be provided. Several lists are generated, sorted and processed herein. The lists may include content or program titles or one or more alphanumeric identifiers or both. The list may not contain the actual content itself.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. As is illustrated the receiving systems are referred to as a set top box or user device 22. Each user device 22 is in communication with a respective antenna 24. Each antenna 24 receives downlink signals 26 from the transmitting antenna 20 of the satellite 18.

The head end 12 may communicate various content 30 or program guide data 32 through the satellite 18. The user device 22 may receive the content 30 and program guide data 32 for use therein. A plurality of set top boxes 22 may be in communication with the head end 12 through a network 36. The network 36 may be one type of network or multiple types of networks. The network 36 may, for example, be a public switch to telephone network, the internet, a mobile telephone network or other type of network.

The set top boxes 22 illustrated in FIG. 1 may be interconnected within a household, multi-dwelling unit or commercial building. The set top boxes 22 may be interconnected through a local network (not illustrated) such as a wireless network or a wired network. The interconnection of the set top boxes 22 may allow for multi-room viewing of content. That is, content stored on one set top box may be communicated to another set top box through the network.

A mobile device 40 may also be incorporated in the system 10. The mobile device 40 may also receive downlink signals from the satellite 18. The mobile device may also be in communication through a wireless network to the head end 12.

The network 36 may also be in communication with a home media center 50. The home media center 50 may be in communication with a plurality of client devices 52. The client devices 52 may be set top boxes or other clients such as an RVU client. Thus, the home media center 50 may have one central storage device therein. The home media center 50 may be used to distribute content, channels, programs and other data to each of the clients 52. The home media center 50 may also include an antenna 24 for communicating with the satellite 18 in a similar manner to that illustrated above with respect to the set top boxes 22.

Figure 2:
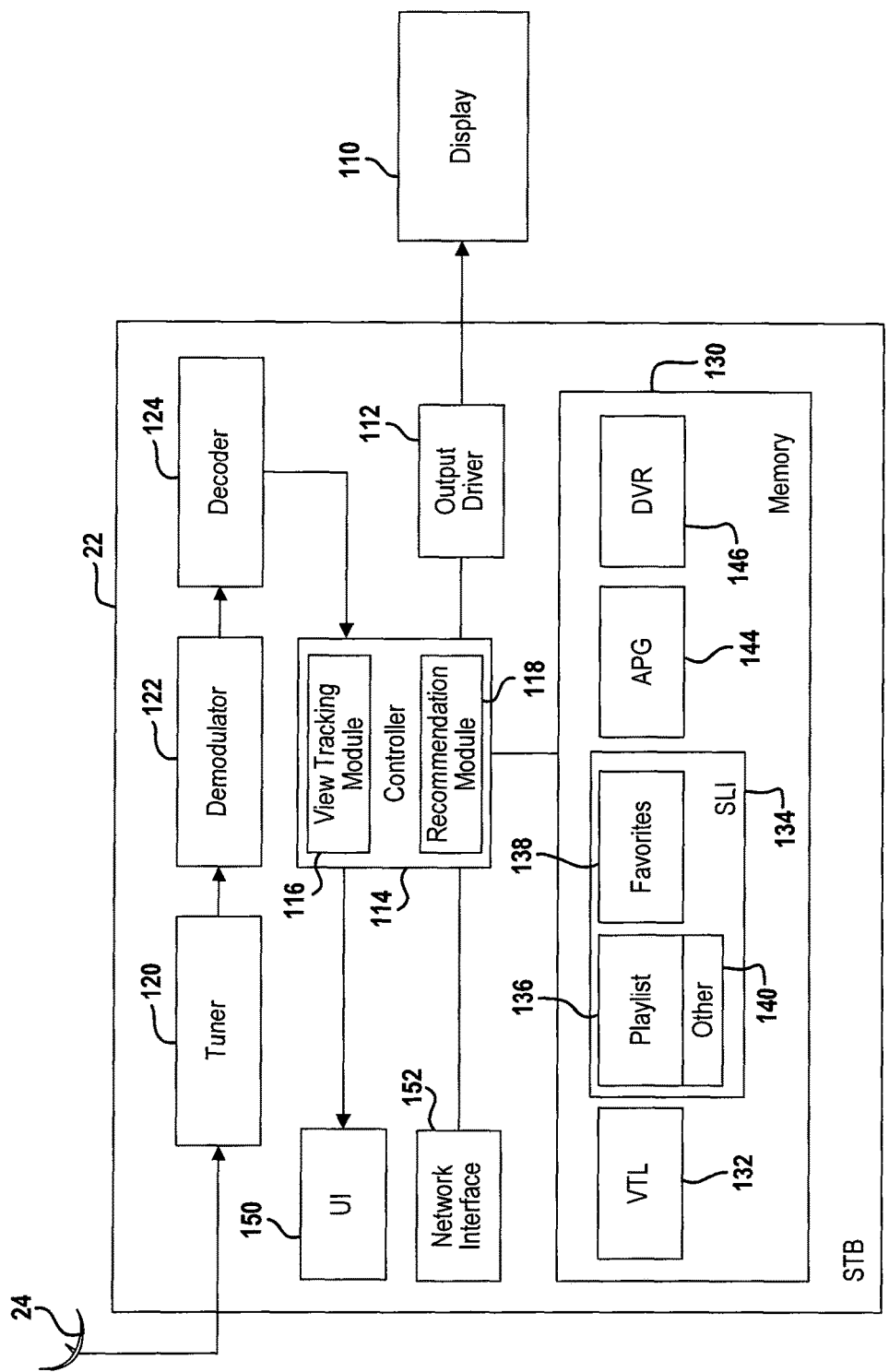
FIG. 2 is a block diagrammatic view of the user device of FIG. 1.

Referring now to FIG. 2, a user device 22, such as a set top box is illustrated in further detail. Although, a particular configuration of the user device 22 is illustrated, it is merely representative of various electronic devices with an internal controller used as a content receiving device. The antenna 24 may be one of a number of different types of antennas that includes one or more low noise blocks. The antenna 24 may be a single antenna 24 used for satellite television reception. The user device 22 may be coupled to a display 110. The display 110 may have an output driver 112 within the user device 22. A mobile device such as that described above may have an omni-directional antenna.

A controller 114 may be a general processor such as a microprocessor that cooperates with control software. The controller 114 may be used to coordinate and control the various functions of the user device 22. These functions may include a tuner 120, a demodulator 122, a decoder 124 such as a forward error correction decoder and any buffer or other functions.

The controller 114 may also include a viewer tracking module 116 and a recommendation module 118. The viewer tracking module 116 is used for tracking and logging viewing events at the user device 22. Ultimately, the viewer history may be logged in a viewer tracking log as will be further described below. The recommendation module 118 is used for generating recommendations corresponding to programs currently available for viewing corresponding to previously watched content during a timeslot. The recommendation module 118 may also generate programs or recordings that are deemed to be future or current programmings that the viewer should like based on an analysis of viewing habits of the viewer. Both types of recommendations will be further described below.

The tuner 120 receives the signal or data from the individual channel. The tuner may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller. Although only one tuner 120, one demodulator 122 and one decoder 124 are illustrated, multiple tuners, demodulators and decoders may be provided within a single user device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for various operational data collected during operation of the user device 22. One type of data storage includes the viewer tracking log 132 obtained and controlled by the viewer tracking module 116. The viewer tracking log (VTL) 132 includes viewer tracking log data that includes data about details of programs that have been watched or played back, including what time that they were watched or played back. The data of the VTL 132 may also include how long they were watched and program details. Recording deletion data within a digital video recorder may also be included in the data of the VTL 132.

Another type of memory 130 is the settings and the list information (SLI) memory 134. The SLI memory 134 may store various types of data including set top box playlist data 136 that has the playlist for content saved within the user device 22. The playlist data contains content visible to users and content currently non-visible to users. Another type of data is the favorite settings for the user device 22. The favorites may be stored in a favorite's memory 138. Other types of data may also be included in the SLI memory 134 which is illustrated as an "other" data memory 140. The other data memory 140 may include various types of data including ignored suggestions which correspond to suggestion or recommendation suggestions that were ignored. Another type of data in the other data memory 140 may include the channels subscription data, the blocked channels, adult channels, rating limits set by the user device 22, current set top box language, prioritizer data, TV resolution data, to do list data, the conditional access module identifier, and a request identifier. The request identifier may be generated at the simulation engine 50 of FIG. 1 as is further described below. Further, time zone data, time of day daylight savings, status data, aspect ratio data, viewing hours data, quick tune list and a zip code may all be included within the other memory 140 of the SLI memory 134.

The memory 130 may also include advanced program guide memory 144. The advanced program guide (APG) memory 144 may store program guide data that is received within the system. The program guide data may store various amounts of data including two or more weeks worth of program guide data. The program guide data from the APG memory 144 may be communicated in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier and producer data. The data may also include various other settings.

The memory 130 may also include a digital video recorder 146. The digital video recorder 146 may be a hard drive, flash drive, or other memory device. A record of the content stored in the digital video recorder is a playlist. The playlist may be stored in the DVR 146 or a separate memory as illustrated.

The user device 22 may also include a user interface 150. The user interface 150 may be various types of user interfaces such as a keyboard, push buttons, a touch screen, a voice activated interface or the like. The user interface 150 may be used to select a channel, select various information, change the volume, change the display appearance, or other functions. The user interface 150 may also be used for selecting recommendation and providing feedback for recommendations as will be described below.

A network interface 152 may be included within the user device 22 to communicate various data through the network 36 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP).

Figure 3:
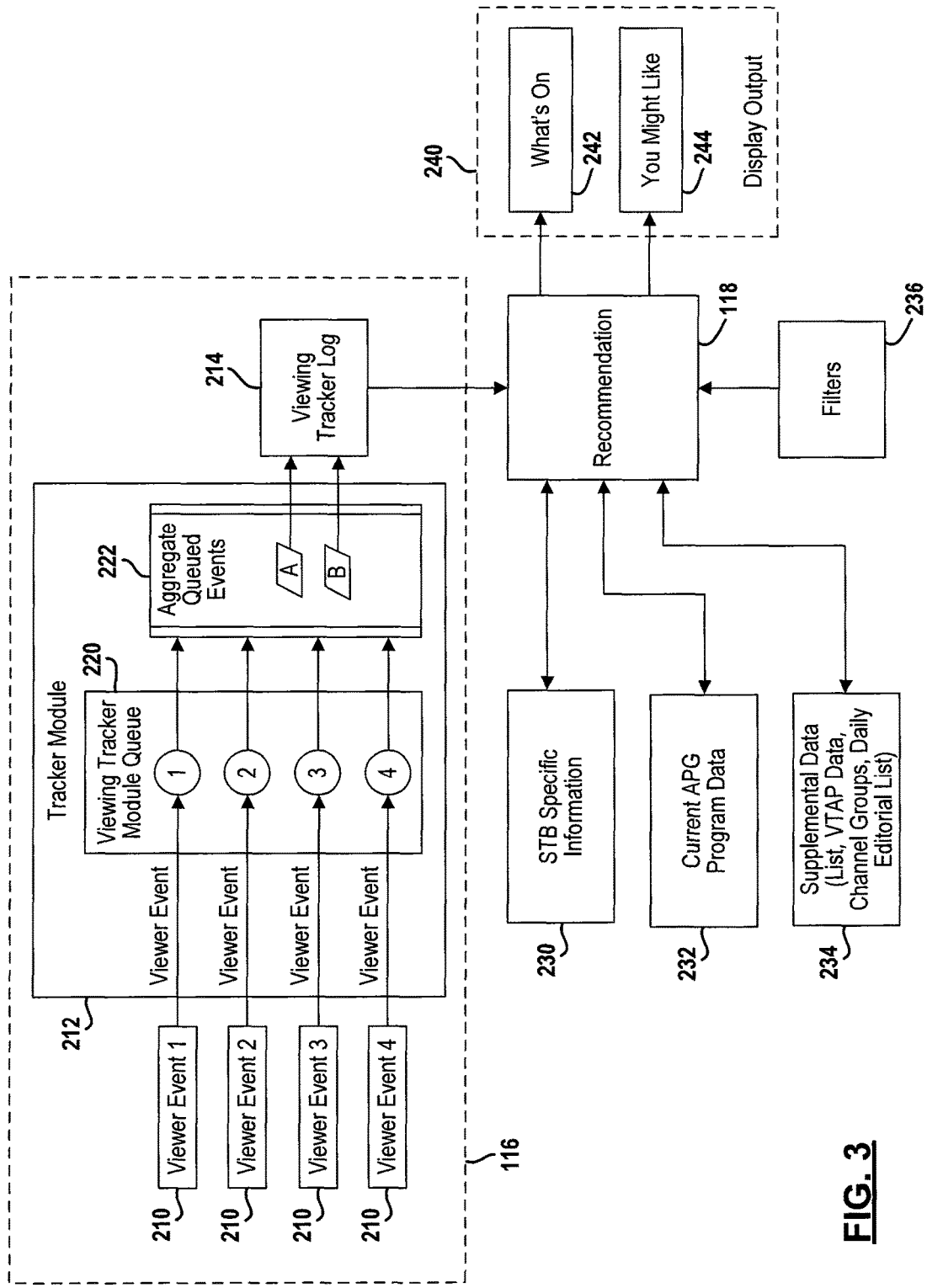
FIG. 3 is a simplified block diagrammatic view of the recommendations module according to the present disclosure.

Referring now to FIG. 3, the recommendation module 118 and its inter-connections are illustrated in further detail. The recommendation module 118 is in communication with the viewer tracking module 116. The viewer tracking module 116 includes a viewer events module 210 which is in communication with a tracker module 212 which in turn is in communication with a viewing tracker log 214. The viewing tracker log 214 may ultimately be stored in the memory of the user device as illustrated in FIG. 2.

The viewer events module 210 generates data corresponding to viewing events so that the recommendation module 118 is able to generate useful recommendations likely to be of interest to the user. Various viewing events may include tuning to live television events, playing back recordings, channel changes and trickplay changes. Trickplay changes may include various digital video recorder functions including skipping various content during playback, or other digital video recorder functions.

The live viewing events may only be logged after a predetermined amount of time has passed while viewing a channel. A live viewing event may therefore have a time the tuning change occurred (which is the time the event was generated minus the 30-second waiting period), the channel object of the channel tuned and a program object of the program currently airing. Other information in the live viewing data may include a dual-live buffer swap.

A live television viewing event may also be generated when the current program ends and another begins in order to note the change of the program object identifier. In such a case, the event may be immediately generated with no 30-second lag between the change and the generation of the event.

A playback viewing event may also be logged. The playback of a program from a digital video recorder may be a playback viewing event. The time the playback began (which is the time the event was generated minus the 30-second waiting period), the channel object of the channel that the recording was recorded from and the program object of the recording may all be recorded.

A channel change may also be logged by the viewer events module 210. If the viewer changes the channel that is currently being viewed live, a channel change event may be logged. The time the channel was changed, the original channel and the destination channel may be logged.

Trickplay changes may also be monitored. If a trickplay is performed and no other trickplays are performed within a predetermined amount of time, the trickplay event may be logged. The time the trickplay change occurs, the location that the trickplay occurs within the recording and the new trickplay state may all be logged.

An idle-mode change may also be logged. That is, if the set top box or user device goes into an idle mode or comes out of an idle mode, an idle mode change event may be logged. The time the idle mode change occurred, a flag indicating whether the user device is entering or exiting an idle mode and a flag indicating whether the idle mode is actually stand-by, may all be logged.

An audio change is another viewer event that may be logged. If the viewer changes audio on the currently-tuned channel or in a recording, then an audio change event may be logged. The time the audio change occurred, a new audio stream identifier and an audio stream language may all be logged.

The viewer event module 210 may also log whether a recording has been deleted. If a recording has been deleted from the digital video recorder, a recording deleted event may be logged. The recording deleted event may include the time the recording was deleted, the channel object of the channel that the recording being deleted was from, the program object of the recording deleted and the reason the recording was deleted such as an explicit viewer deletion, a recording expiration, no room on the hard drive or the like.

The viewer events from the viewer events module 210 are communicated to the tracker module 212 which gathers the viewer events, analyzes them and based on the analysis adds the entries to the viewer tracking log 214. The viewer tracking log 214 may include the watched programs and recordings deleted.

The tracker module 212 may include a viewing tracker module queue 220 that queues the various viewer events. An aggregate queued events module 222 may aggregate the queued events and store them within the viewing tracker log 214.

The viewer tracking module 116 may be specific to one user device in a system such as a networked system illustrated in FIG. 1 as reference numbers 50 and 52. The home media center 50 may keep track of data individually for each client. The home media center 50 could also be configured to aggregate data such as most channels watched, the viewer tracking log and other data.

The recommendation module 118 may also be in communication with set top box specific information 230 including the playlist and the channels subscribed to. These may be referred to as "channels I get."

The recommendation module 118 may also be in communication with the current program guide data 232. The program guide data 232 corresponds to the currently available programs provided by the head end.

The recommendation module 118 may also be in communication with supplemental data 234. The data 234 corresponds to various data objects that may be sent together with the program guide data. The supplemental data 234 may include channels recommended. The recommended channels may be recommended by a person or determined by machine. The channels recommended may be communicated from the head end 12 as a data object to the user device 22. The recommended channels may be in a list from most recommended to least recommended.

Outside sources may also provide data. Outside sources may include sources that provide recommended programs. For example, programs may be recommended based upon a selection. Thus, all recommended programs related to a selected program may be provided. A list of related television series related to a selected television series may also be provided. The recommendations may be performed based upon various object data. The supplemental data may also include a channel group which groups channels together. For example, related channels may be grouped together based upon content typically played at such channels. A daily editorial list may also provide data selected by a person or a machine for a particular time period. For example, if a certain sporting event such as the Super Bowl will be played that day, this may be included within the daily editorial list. Other special events for a particular day may also be included within the daily editorial list.

A filter module 236 for filtering available content may also be used. The filter module 236 may include the watched program ratings, channel locks, adult content filters or other user selectable filters. The filters prevent content titles from appearing in the recommendations lists.

The recommendation engine 118 may generate an output to a display 240. The output is a recommendations list having titles, poster or other identifiers of content that may be desirable for the user. In the present example a first recommendation list and a second recommendation list is displayed simultaneously. Each list is generated using a different method. The display 240 may include a What's On display 242 as the first recommendation list and a You Might Like display 244 as the second recommendation list. The output may be in graphical, alphanumeric, or a combination or graphical and alphanumeric identifiers. These passages will be further described below.

Figure 4:
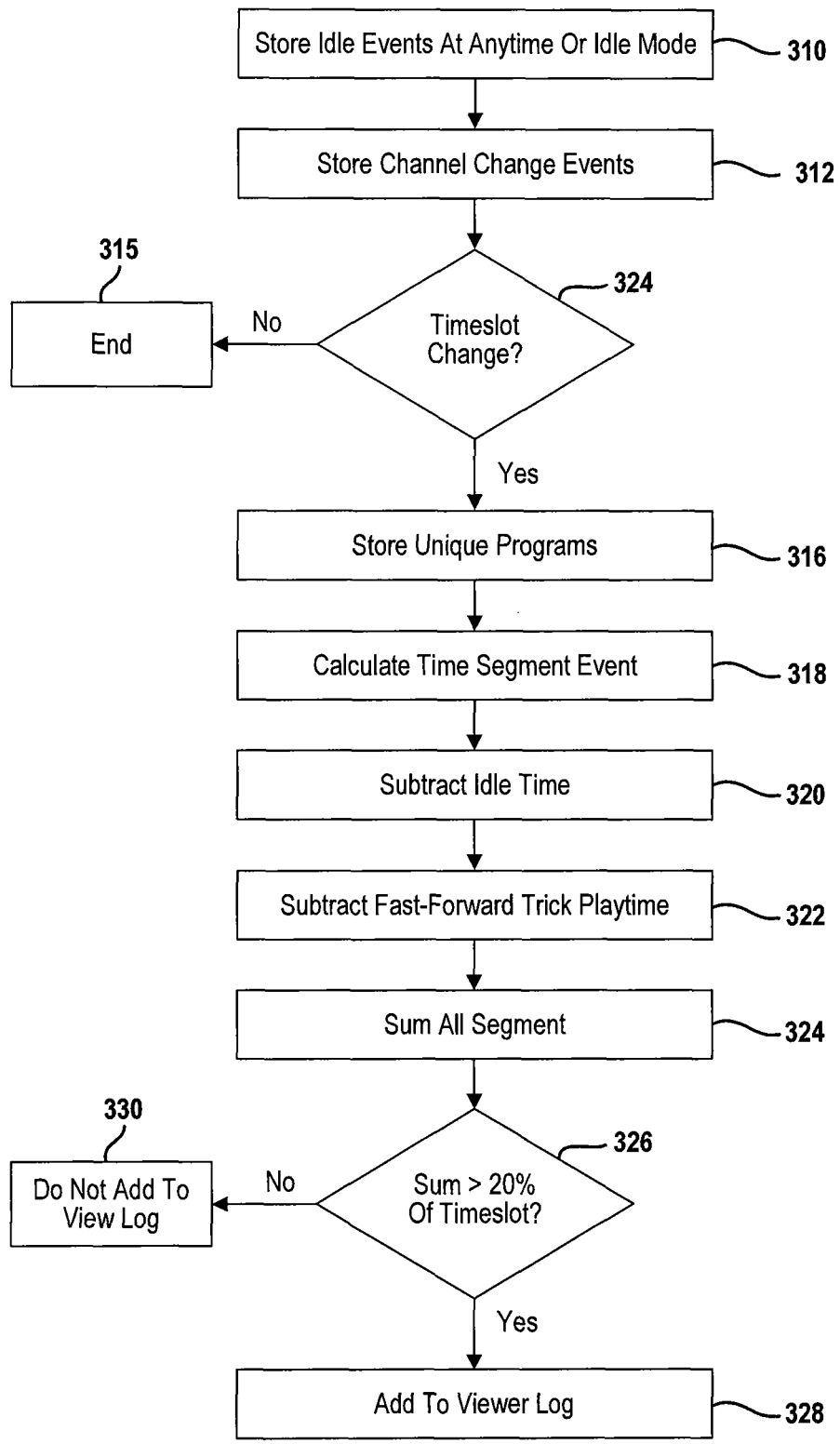
FIG. 4 is a flowchart of a method for forming a viewer tracking log.

Referring now to FIG. 4, a method for determining whether a program was watched live or a recording was watched is set forth. In step 310, the idle mode change events are stored. Further, whether the user device is in an idle mode is stored. In step 312, channel change events are stored. In step 314, it is determined whether a timeslot has been changed. If a timeslot has changed in step 314, the unique programs are stored in step 316. After step 316, the total time watched for each program is stored. This may be performed by calculating the time a segment of a program was watched by calculating the delta from the time of a live television viewing or playback viewing event at the time of the next live television viewing or playback event or the time of the next channel change event. This is performed in step 318. In step 320, the time that the set top box was in idle mode is subtracted from each segment in step 320. In step 322, any fast-forward trickplay modes are also subtracted.

In step 324, all the segments of the same program are summed together. In step 326, not all of the events may be stored in a viewer log. This reduces the size of the viewer log to a manageable size. In this case, 20% of a timeslot is used. Thus, if the sum of all the segments in a timeslot is greater than 20% of the timeslot in step 326, the viewer event is added to the viewer log in step 328. In this case, a timeslot may be 30 minutes and thus the 20% corresponds to six minutes. Of course, other times may be used. The 20% is merely used as a non-limiting example. In step 326, if the sum of all the program segments does not total 20%, then step 330 does not add the program to the viewer log.

A timeslot is a predefined time period having a start time and an end time. For example, a timeslot may be 7:00 p.m. to 7:30 p.m. If the present time is 7:15 p.m., 7:00 to 7:30 p.m. is the current timeslot and 7:30 p.m. to 8:00 p.m. is the next timeslot.

Figure 5:
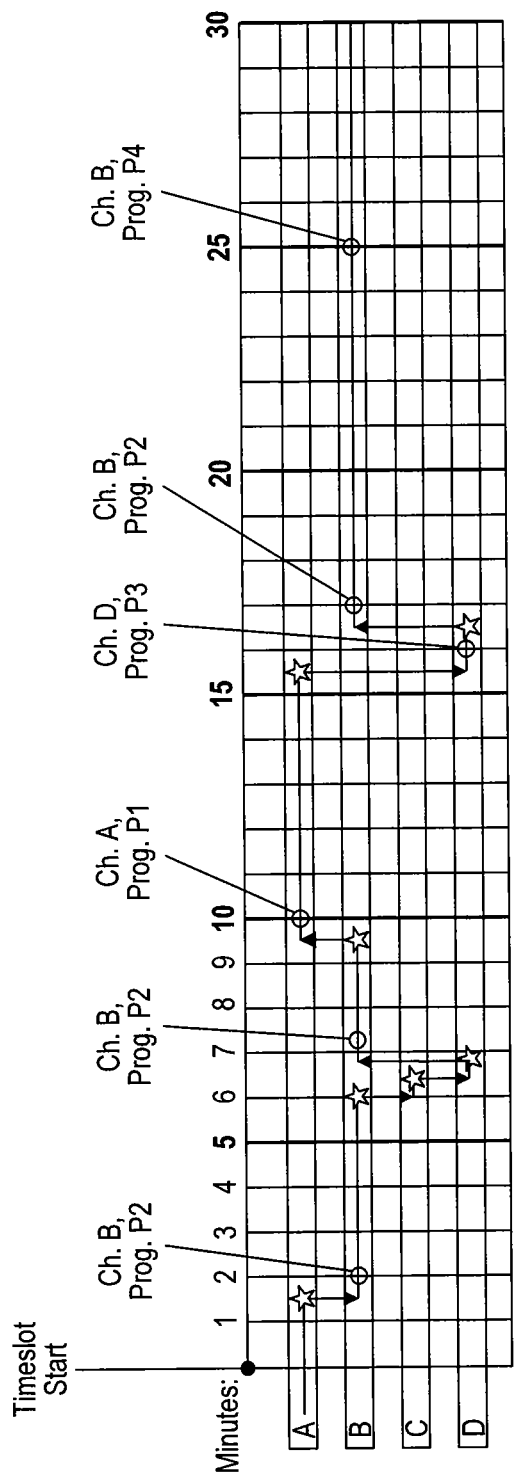
FIG. 5 is a channel versus time plot of channel changes for an example of a user device operating.

Referring now to FIG. 5, an example of a channel usage event during a timeslot is set forth. In this example, the timeslot is 30 minutes. However, various other timeslots may be used. The timeslot for a recording may be different than a live event such as 60 minutes. In this example, four channels A, B, C, D are used. For the first segment between 0 and 1.5 minutes, channel A or program P1 is watched. In the second segment, channel B is tuned to program 2 (P2). The second segment continues from 1.5 minutes through 6 minutes. The channel is then changed to channel C, then channel D, then back to channel B. This occurs between minutes 6 and 7. Between minutes 7 and 9.5, channel B program P2 is tuned. At time 9.5 minutes, the channel is tuned to program A until 15.5 minutes. At 15.5 minutes, channel D, program P3 was watched for one minute. The channel was then returned to channel B program 2 until 25 minutes. At the 25-minute time period, channel B switched programs to program P4.

Referring now to FIG. 6, the viewer tracking module receives the event set forth in the table illustrated therein. The live tuning events set forth in the table are limited by the threshold period. The tuning to channels C and D at the 6-minute mark do not result in a live television tuning event since their period is shorter than the 30-second time threshold. The tuning event at channel B at the 25-minute mark with no channel change occurs because the program changed from program P2 to program P4.

Referring now to FIG. 7, a channel tune time calculation table is illustrated. The programs are sorted and the viewer tracking log obtains the data within the table. From this table, it can be determined that program P1 was watched for 7 minutes and 30 seconds total. Program P2 on channel B was watched for 15 minutes and 45 seconds while program P3 on channel D was watched for 1 minute and program P4 on channel B was watched for 5 minutes. The programs P3 and P4 do not meet the minimum 6-minute time and thus will be discarded in the viewer tracking log. Consequently, program P1 on channel A will be logged for 7 minutes and 30 second and program P2 on channel B will be logged for 15 minutes and 45 seconds in the viewer tracker log.

Figure 8:
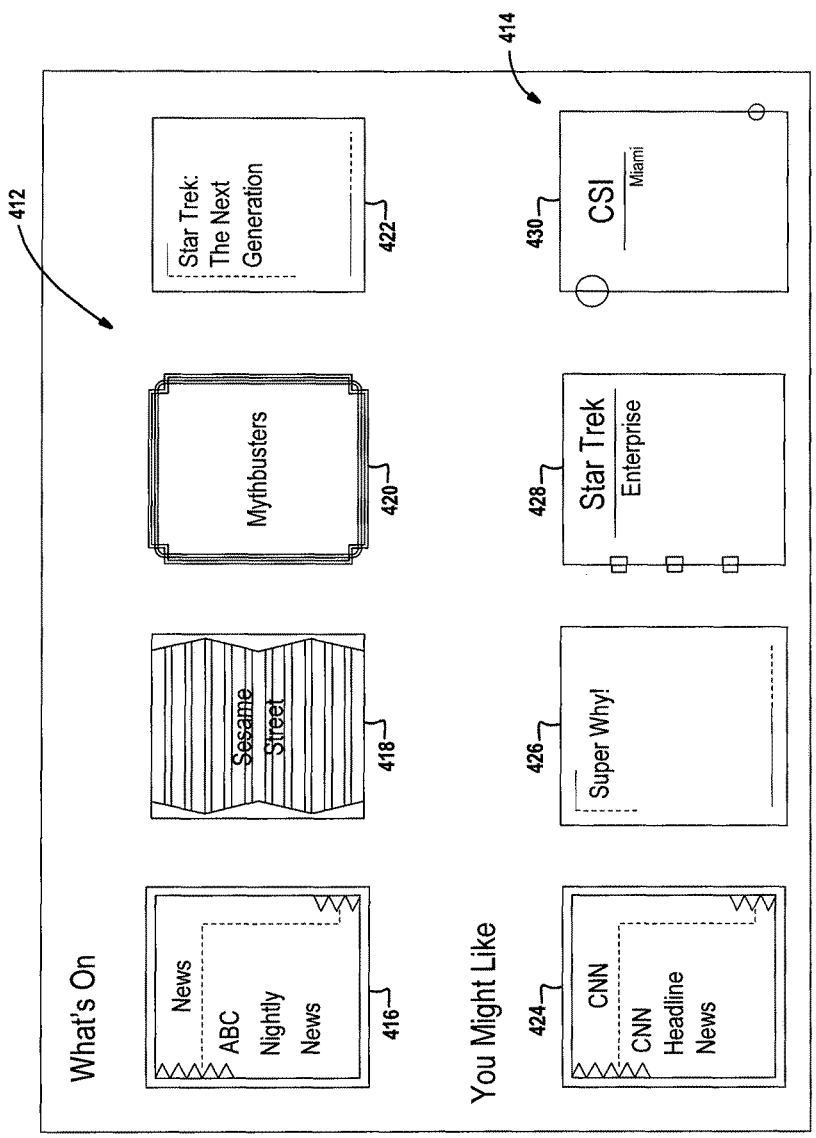
FIG. 8 is a simplified view of recommendations provided by the recommendations engine for a What's On portion and a You Might Like portion.

Referring now to FIG. 8, one example of the recommendation process results is a recommendation screen 410 which is broken down into a What's On portion 412 and a You Might Like portion 414. The What's On program list has program content titles for programs that are regularly watched during a current timeslot. The program content in the What's On list is content that is currently being broadcast. The What's On list may include a plurality of thumbnails for 416, 418, 420, and 422. An alphanumeric list may also be provided in addition to or in place of the thumbnails. The television or display associated with the set top box may be directly tuned by selecting one of the thumbnails 416-422 using the user interface.

The You Might Like portion 414 lists recommendations for the viewer. The You Might Like portions are programs that are not regularly watched by users. The You Might Like recommendations can be available now or in future. A plurality of thumbnails 424-430 is provided. The thumbnails 424-430 displayed in the You Might Like portion 414 correspond to recommendations from the recommendation engine.

The viewer-tracking and recommendation algorithms described herein operate in the satellite-connected set top box with or without a network connection or feedback from the set top box to the head-end. Feedback may be provided from broadband-connected set top box users, to enable PC or mobile users to log in to their account and view their recommendations. The feedback may also allow analysis and improvement of the performance of the recommendation algorithms.

Figure 9:
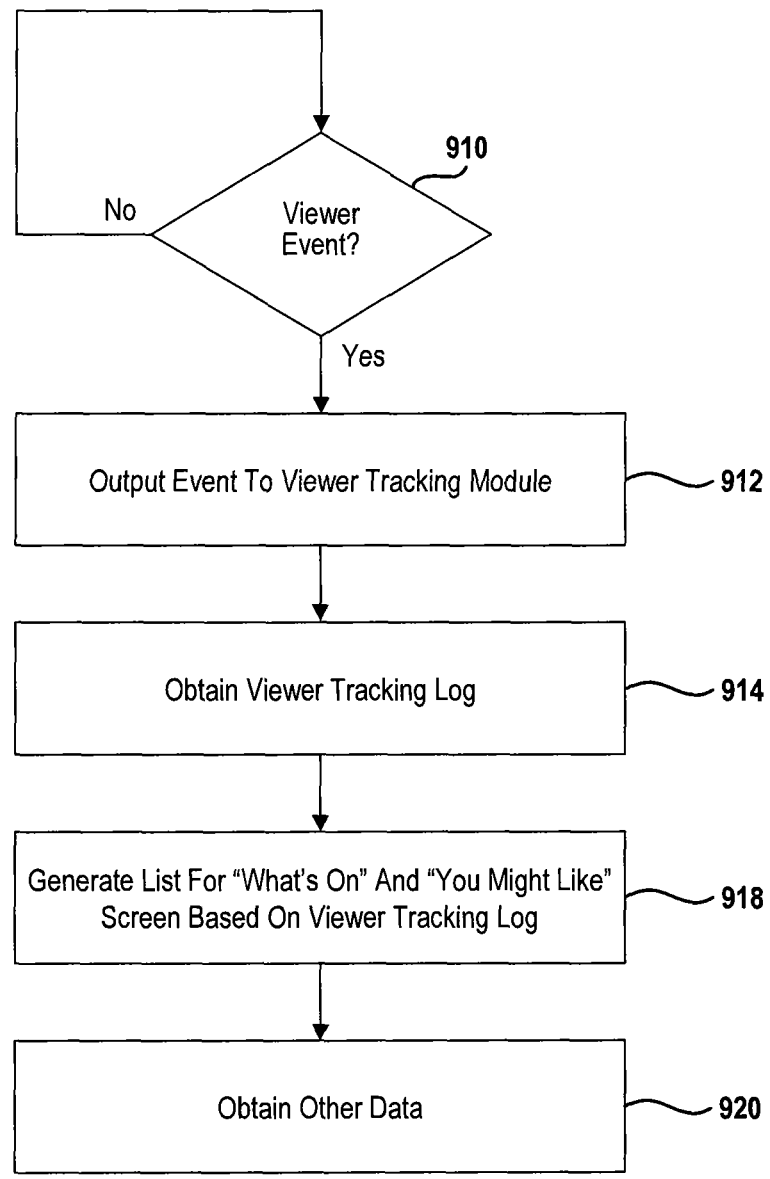
FIG. 9 is a flowchart of a simplified method for generating the What's On list and the You Might Like list.

Referring now to FIG. 9, a high-level flowchart of the process is set forth. In step 910, when a viewer event is generated, step 912 outputs the viewer event to the viewer tracking module. From the viewer tracking module, a tracking log is generated in step 914. In step 918, a list of recommendations for the What's On and the You Might Like screen displays based upon the viewer tracking log is obtained. In step 920, other data is obtained by the system to populate the What's On and the You Might Like screen display. Further details of this method are set forth below.

Figure 10:
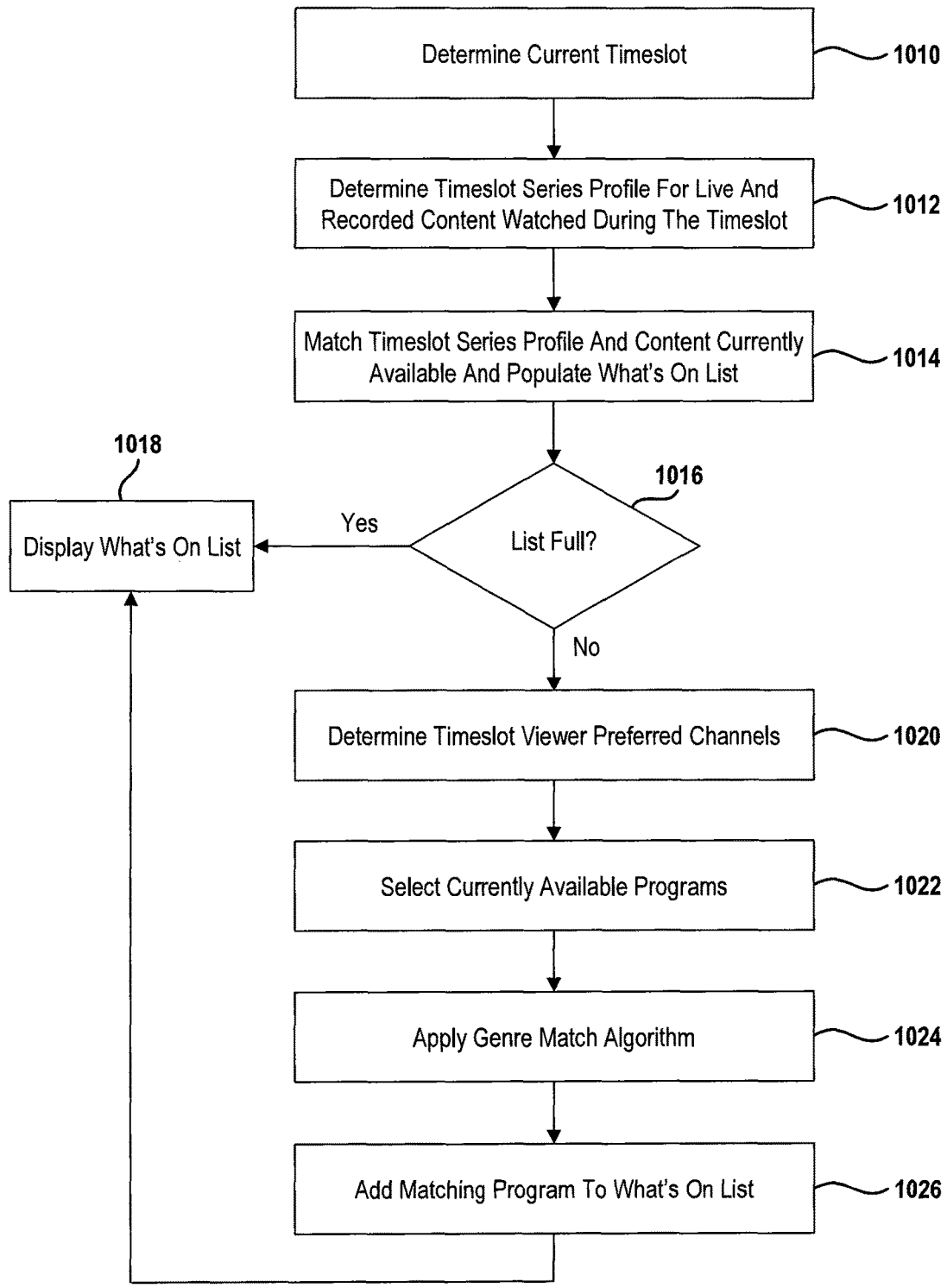
FIG. 10 is a detailed flowchart of a method for generating a What's On list.

Referring now to FIG. 10, a method for generating the What's On list of recommendations at the recommendation engine is set forth. In general, the method uses viewing habits at the user device to provide appropriate recommendations. As will be described below, when the viewing habits do not provide enough information to fill up a list, other sources of data may be used.

In step 1010, a current timeslot is determined. A current timeslot is determined in order to analyze the programs and channels normally viewed at that time of day or day of week. The current timeslot is used to generate recommendations that are relevant to the viewers that normally view television at that time of day or week. A current timeslot enables recommendations to be generated for a shared television based on different viewers and different viewing habits at different timeslots. Determining the current timeslot will be further set forth below. In general, the current timeslot for the present example is 30 minutes. Thus, data will be analyzed for the current 30-minute timeslot. The next timeslot may also be used depending on the relative time within the timeslot. The choosing of the timeslot will be described further in FIG. 12.

In step 1012, a timeslot viewing profile generation algorithm is used to define a timeslot viewing profile for programs viewed live and for recordings played back during the current timeslot. The timeslot viewing profile may identify a program series. In such a case, the profile may be referred to as a timeslot series profile. A series is a program title that has multiple episodes. Traditionally, a series runs consecutive weeks on a network. Although many networks offer repeats of various times. Again, the timeslot series will be described further below in FIG. 15. It should be noted that the timeslot for playback recordings versus live television may be different. For example, live recordings may have 30-minute timeslots while live recordings may have 60-minute timeslots. Of course, the timeslots may both be the same. The timeslot series profile may return a plurality of content titles for series most watched within a timeslot. In step 1014, the timeslot viewing profile is matched against currently available content in the program guide. The series identifier in the content identifier may be compared to a series identifier of available content in the program guide. The list obtained during matching is used to populate the What's On list.

In step 1016, it is determined whether or not the What's On list is full. If the What's On list is full in step 1018, the list is displayed. As described above, the list may be displayed in a thumbnail, a poster, an alphanumeric display, or combination thereof.

Referring back to step 1016, if the list is not full, additional recommendations for the list may be obtained. In step 1020, a timeslot viewer preferred channels list may be developed. The timeslot viewer preferred channels list returns a list of preferred channels or typical channels watched during the timeslot of interest. The list provides a score or ranking value for each channel to provide a relative indication of importance or usage. More popular channels will be ranked higher. In step 1022 select the current programs from the timeslot viewer preferred channels list. In step 1024, a genre match algorithm based upon the viewer preferred program genres may be used to provide a score or ranking for programs from available content on the viewer preferred channels in the timeslot that match the typical genre. Higher ranked channels will be matched first. In step 1026, the highest ranking program matches are added to the What's On list. After step 1026, the What's On list is displayed on a display associated with a user device. The timeslot viewer preferred channels and genre-matching algorithm will be described further below in FIGS. 13 and 17, respectively.

It should be noted that the algorithm for generating the What's On list may have the contents filtered. That is, parental settings or rating settings may be set by the user at the user device. That is, adult content may not be added to the list if adult content is to be excluded. Likewise, content ratings higher than PG 13 may also not be added to the list. Thus, at any point during the process, filters may be used to prevent content from being added to the What's On list.

Figure 11:
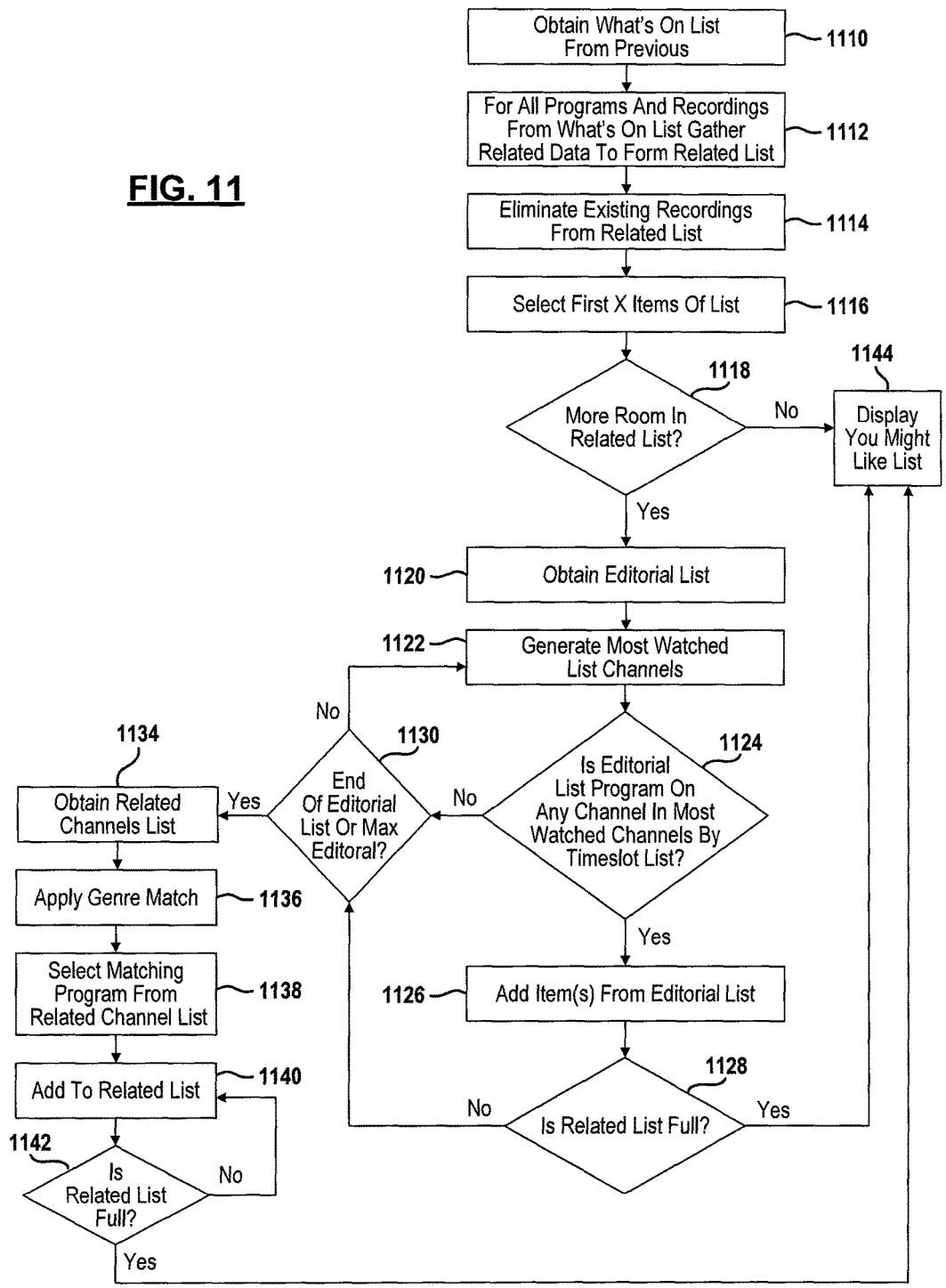
FIG. 11 is a flowchart of a method for generating a You Might Like list.

Referring now to FIG. 11, a method for generating the You Might Like list of recommendations are set forth. In step 1110, the What's On list from FIG. 10 is obtained. Thus, the What's On list provided from steps 1010-1014 are used. Should additional features from steps 1020-1026 be inserted into the list, these may be added. In step 1112, similar programs to those found in the What's On list are generated. Similar programming may be found using metadata or other types of data delivered from the head end. as will be described below. The related program data may be provided with the programming guide data. For example, data for related programs may be included in extended program objects of the program guide data. The related program data may be automatically generated or inserted at various systems including the head end. The related program data may be received from external data sources. The related program data is such that when a viewer watches a program (either live or recorded), the related program data may be used as one of the factors in predicting other programs content that the viewer might like. Related programs are determined in step 1112 for both recorded programs and those in the What's On list from FIG. 10.

In step 1114, related program titles that are already stored in the user device are eliminated. That is, the content identifier or program object identifier may be used to sort through the related list and eliminate identical content. In step 1116, the first X number of content titles from the reduced list may be used for the You Might Like list. The value X may be chosen as 2 in the present example. However, various numbers of related contents may be chosen.

In step 1118, if there is more space in the related or You Might Like list, step 1120 is performed which obtains an editorial list. The editorial list is a list of content titles that may be set forth for a timeslot or other time period. The head end or external source may generate the list. The list may be a ranked list so the higher ranked content titles are compared first. In step 1122, a most watched channels list is generated. In step 1124, the editorial list is compared to the most watched channels list. That is, if any of the editorial list programs are on the most watched channels, step 1126 adds the program title or content identifier from the editorial list to the related or You Might Like list. The editorial list may also include a target channels list with each content title such that the title may also be added if any of the target channels is on the most watched channels list. The editorial list may also include a list of related programs or series with each content title such that the title may be added if any of the related programs or series matches a regularly watched program or series in the timeslot viewing profile generated in step 1012. The editorial list may also include a universal editorial content title, such that the title may be added for all viewers in a timeslot without checking their most watched channels list. The process in steps 1124-1126 is repeated until there is no more room in the You Might Like list or the related list, or the maximum number of daily editorial list programs has been added. Step 1128 determines whether the related or You Might Like list is full. If the list is not full, step 1130 determines whether the end of the editorial list or the maximum number of editorial items has been added to the list. In one embodiment, only two editorial list matches may be added to the related or You Might Like list.

When the end of the editorial list or the maximum editorial entries has not been reached in step 1130, step 1122 is again performed. When the end of the editorial list or the maximum editorial entries has been added to the related list in step 1130, step 1134 seeks to add more content to the related or You Might Like list. Genre-matching may be used to obtain further items for the related or You Might Like list. In step 1134, a related channels list is obtained. In step 1136, genre-matching may be applied to the upcoming programs on the related channels. Genre-matching may be performed for the current timeslot as well as a future timeslot. In step 1138, a list of matching programs from the related channels list is obtained. Values may be obtained for the genre-matching of these programs. When a content title has a highest genre match value or exceeds a minimum threshold corresponding to the highest likelihood of a match, step 1140 adds the content title to the related list. The closeness value is described below. If the related list is not full in step 1142, step 1140 may add another content from the genre-matched related channels list. When the related or You Might Like list is obtained, step 1144 displays the You Might Like list with the various content titles. The You Might Like list has a content identifier, a channel identifier and a program identifier associated therewith. However, only a thumbnail or alphanumeric descriptor may be displayed. The display may also be formed after steps 1118 and 1128 are performed. That is, after there is no more room in the related list in step 1118 or the related list is full in step 1128, step 1144 is performed.

Figure 12:
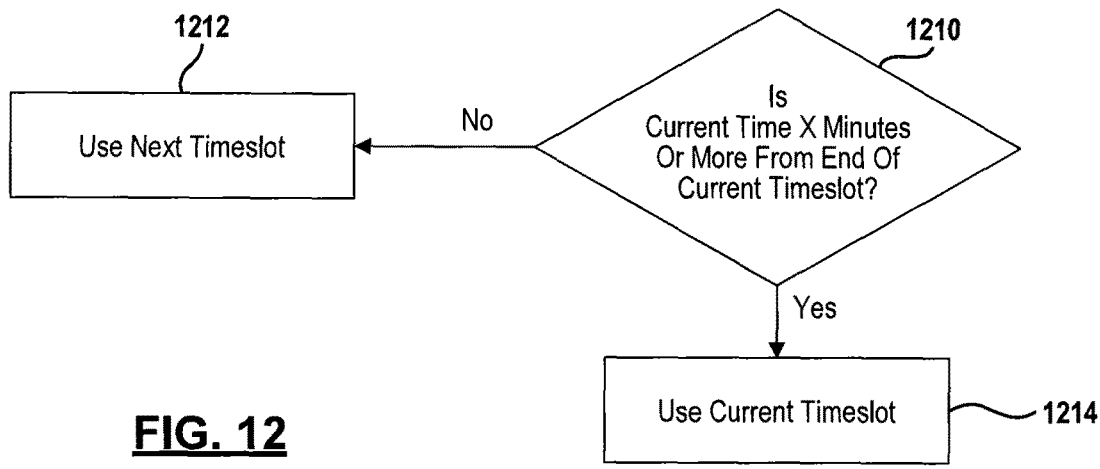
FIG. 12 is a flowchart of a method for determining the time slot.

Referring now to FIG. 12, as mentioned above, the timeslot of interest must be determined. The timeslot used in the present example is 30 minutes for live programming. The timeslot may be extended for recorded programming such as 60 minutes. Also, if the current timeslot is near the end of the timeslot, there is no sense in providing current timeslot information. Rather, the next timeslot information may be provided near the end of the timeslot.

In step 1210, if the current time is X minutes or more from the end of the current time period (which may be 30 minutes), step 1214 uses the current timeslot. The value X may be five minutes or other appropriate setting. In step 1210, when the current timeslot is not X minutes or more from the end of the current time period, the next timeslot is used in step 1212. That is, when the current time is closer than X minutes, step 1212 uses the next 30-minute timeslot for generating recommendations. The timeslot definition may be used in FIG. 10 which in turn is used in FIG. 11. Thus, both the What's On recommendation list and the related or You Might Like recommendation list are based on the timeslot determination of FIG. 12.

Figure 13A:
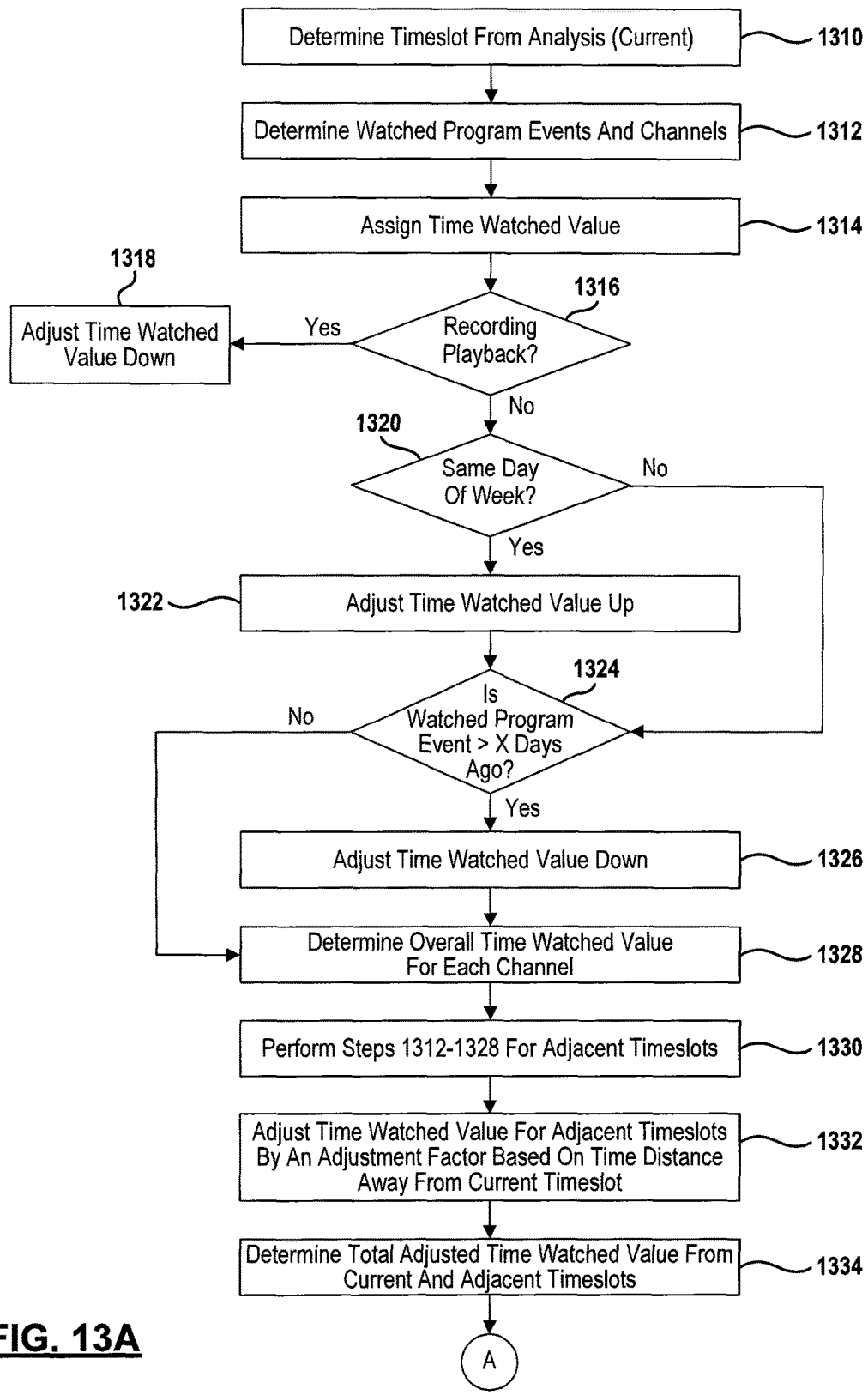
FIG. 13A is a method for generating the most watched channels by timeslot list.
Figure 13B:
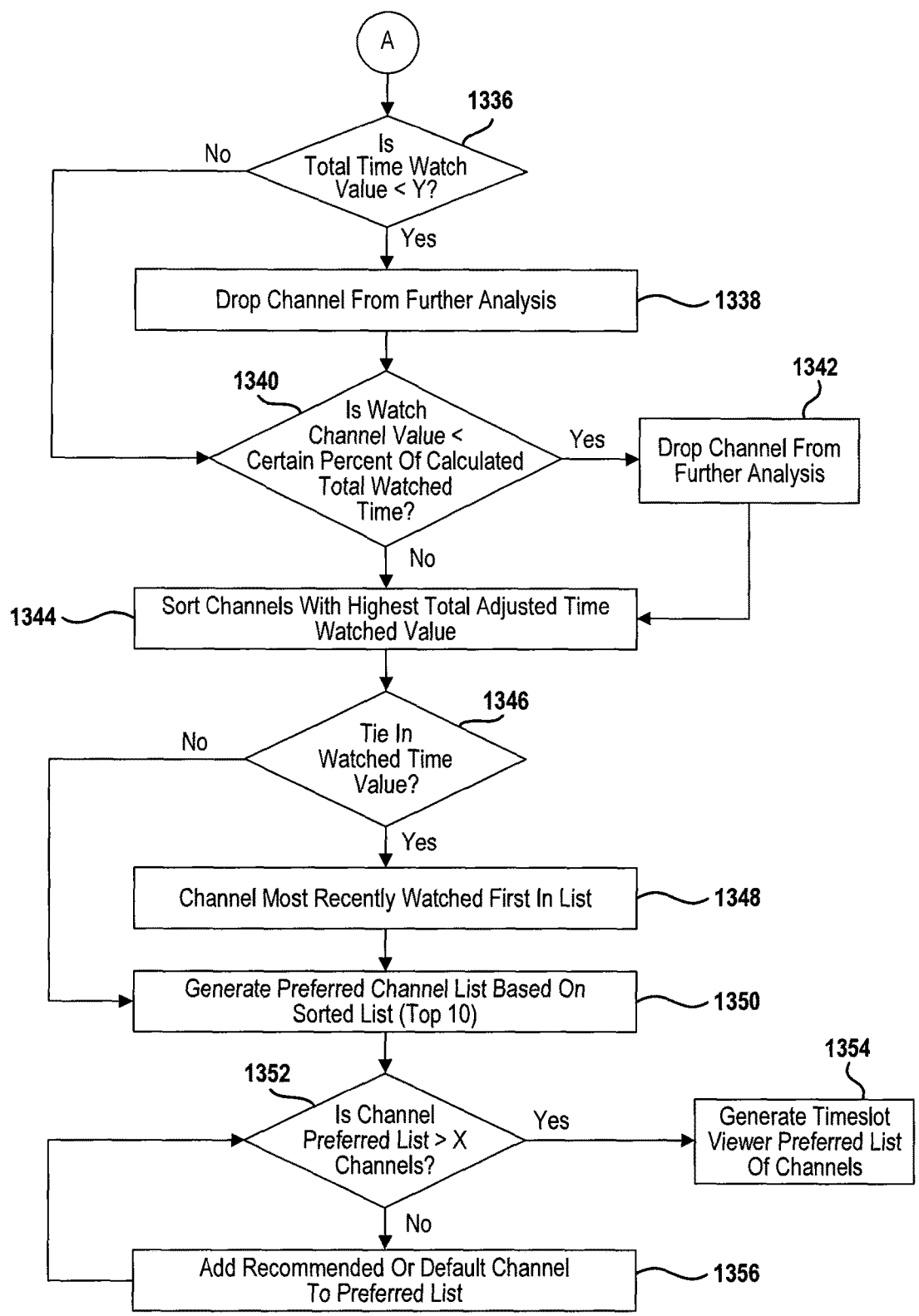
FIG. 13B is a flowchart for generating the timeslot viewer preferred channels list.

Referring now to FIGS. 13A and 13B, a list of the most watched channels by timeslot is determined. Thus, a list of the channels in a ranked order by count or other value such as a time watched value may be provided corresponding to the most popular channels watched during a particular timeslot. The channel list may include a channel identifier which corresponds to channels in the program guide.

In step 1310, the timeslot for analysis is determined. The timeslot for analysis may be the current timeslot or next timeslot depending on the current time relative to the end of the timeslot as described above in FIG. 12.

In step 1312, the watched program events from the viewer tracking log are obtained from previous days. The program identifier, channel identifier, and the time watched for each of the programs are obtained from the viewer tracking log. The time watched value is assigned in the viewer tracking log as set forth in step 1314. As will be described below, the time watched value may be adjusted. In step 1316, it is determined whether the watched program event was a playback of a recording or a live program. In step 1316, if the program is a recording, the time watched value may be adjusted downward by an adjustment factor. The adjustment factor may be adjusted downward to account for the playback of recordings being less important than the live viewings.

Referring back to step 1316, if the event is not a recording playback, step 1320 is performed. Step 1320 is also performed after step 1318. In step 1320, it is determined whether the "watched program" event occurred on the same day of the week as the current day. If the watched program event occurred on the same day of the week, the time value is adjusted upward in step 1322. Again, this may be another adjustment factor.

If the event did not occur on the same day of the week and after step 1322, step 1324 determines whether the watched program event occurred greater than X days ago. The value X may be set so that an adjustment factor may be used to reduce the value of old content. In step 1326, if the watched program event is greater than X days old, step 1326 adjusts the time value downward by an adjustment factor. After step 1326, step 1328 determines the overall time watched value for each channel. The overall time watch value of the values sum together and adjusted per the adjustment factors above.

After step 1328, step 1330 may perform the steps of 1312-1328 for adjacent timeslots. That is, the same analysis may be performed for future timeslots. This is an optional step. After step 1330, step 1332 may adjust the time watched value for adjacent timeslots by an adjustment factor based on the time distance away from the current timeslot. Thus, timeslots directly adjacent to the current timeslot may be adjusted downward less than slots two timeslots ago.

After step 1332, step 1334 determines the total adjusted time watch values for current and adjacent timeslots. A most watched channels list may then be generated. Each element of the list may include a time watched value. The list may be sorted by the time watched value with the most time watched being at the top of the list.

In step 1336, it is determined whether the total time watched value is less than Y. If the total time value is less than Y, the channel may be dropped from further analysis in step 1338. The value Y may be a value chosen so that only significantly watched values are used. In step 1340, it is determined whether the channel watched time value is less than a certain percentage of the total watched time. This step is also performed after step 1336. If the total watched time value is less than a certain percentage, step 1342 removes the channel from further consideration. Referring back to step 1340, when the watched value is not less than a certain percentage of the total watched time value. Step 1344 sorts the channels with the highest total adjusted time watched value. In step 1346, if there is a tie, step 1348 places the channel that was most recently watched first in the list. Step 1350 is performed after step 1348 and after step 1346 if no tie was found in the watched time value. In step 1350 a preferred channels list having channel identifiers in an ordered manner based upon the time watched is generated. Various numbers of channels may be selected, such as the top 10 channels. In step 1352, if the preferred channels list is greater than X channels, a timeslot viewer preferred list of channels is generated in step 1354.

In step 1352, if the preferred channels list is not greater than X channels, then step 1356 adds recommended channels from a recommended list to the preferred list. That is, the head end may generate a recommended channels list with default channels to use for recommendations if no other information is available. These channels may likely be the most popular channels determined by the user serviced by the head end. The channels from the list may be screened so that the channels received by the particular set top box or user device are used. The recommended list may include content in various categories and may alternate the categories. For example, movie, sports, kids, news channels may all be provided within the recommended channels list. However, one channel from each category may be provided at the top of the list so that the list may be varied in content. The recommended channels list may be communicated to the user device through various means including channel objects communicated with the program guide data.

Figure 14:
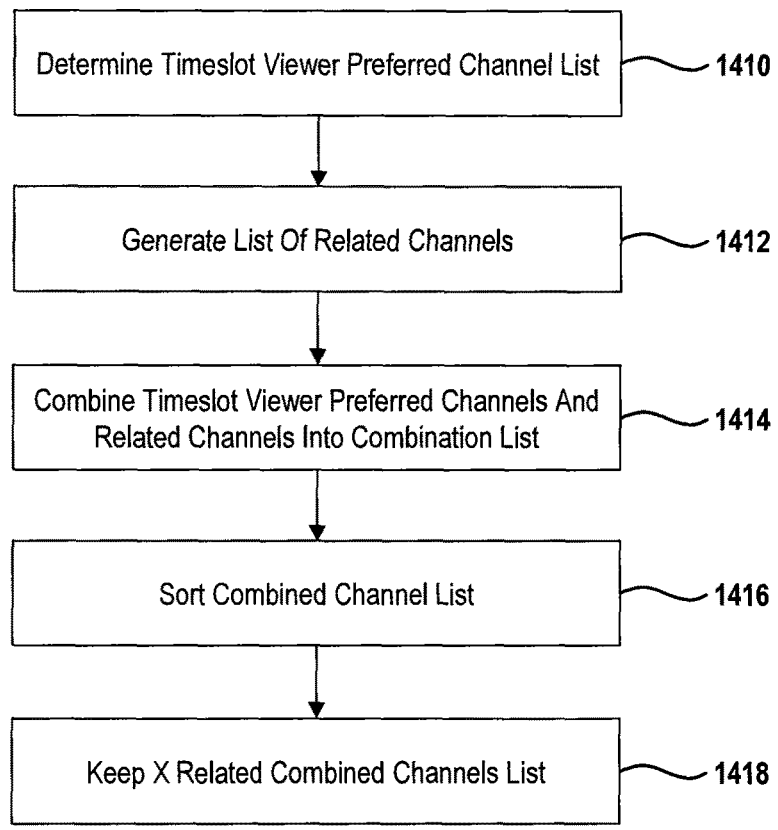
FIG. 14 is a flowchart of a method for generating the related channels list.

Referring now to FIG. 14, a method for generating a list of related channels to the timeslot viewer preferred list of channels is set forth. In step 1410, the timeslot viewer preferred channels list is generated from FIG. 13. In step 1412, a list of related channels for each channel in the list is determined. A list of related channels may be determined by descriptors provided with the program guide data for each channel. Fixed relationships between various channels may thus be provided and determined. The list of related channels includes channels that display similar programs or channels that are commonly watched by viewers having similar interests. In step 1414, the timeslot viewer preferred channels list and the related channels list are combined into a combined related channels list. In step 1416, the combined related channels list is sorted by value or score. Each channel in the combined related channels list is ranked or given a score value based on how related they are to what is watched at the user device. In step 1418, a limited number of channels from the combined related channels list are used. For example, the top 30 channels may be provided in the combined list.

Figure 15:
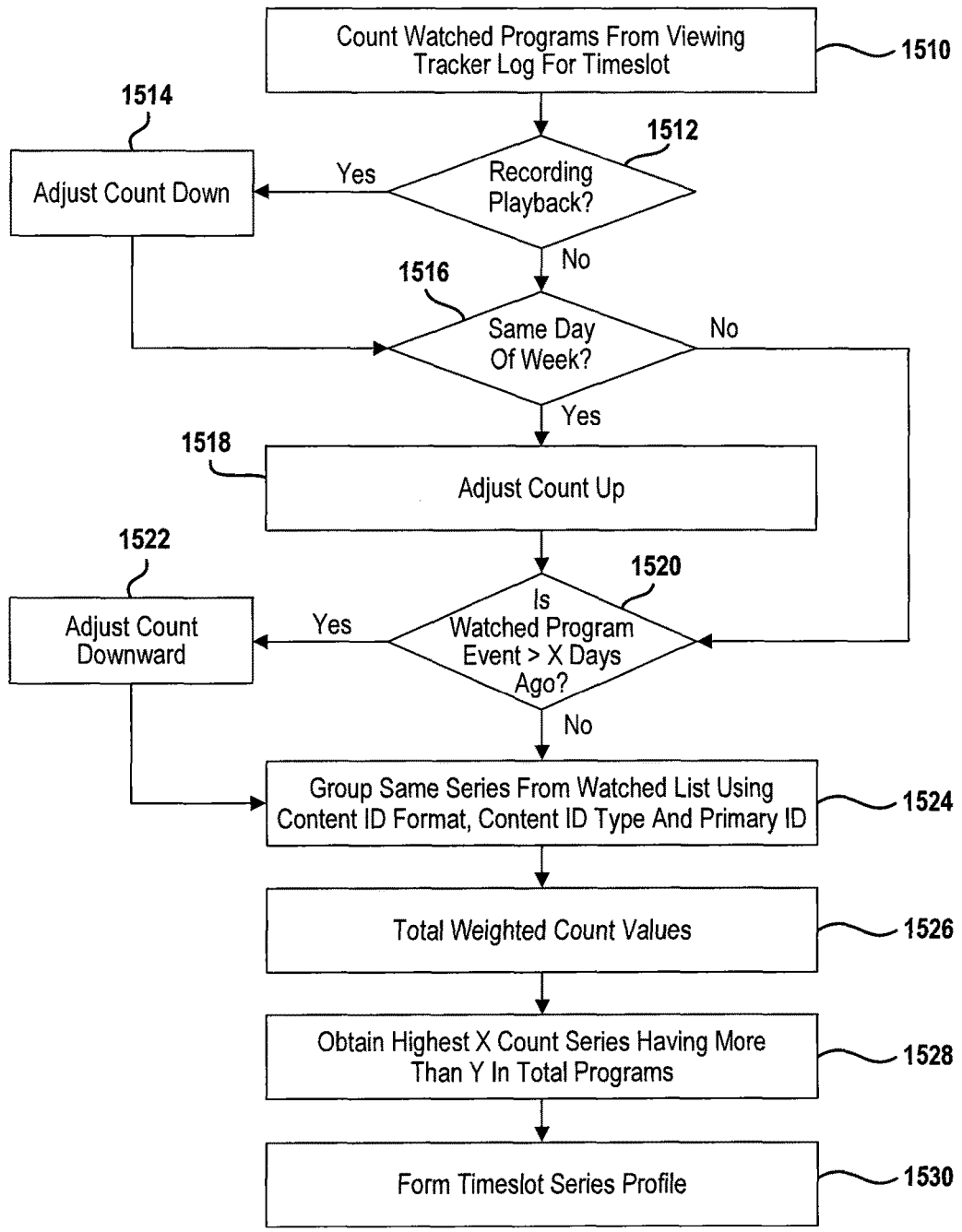
FIG. 15 is a flowchart of a method for generating a timeslot series profile.

Referring now to FIG. 15, a method for determining what television series have been watched during a specific timeslot is set forth. The series watched during a specific timeslot are referred to as a timeslot series profile. The timeslot series profile includes the program or series identifier. In step 1510, the viewing tracker log is analyzed to count the watched program events on previous days during the timeslot being analyzed. The watched program events may include both programs viewed live or played back from the digital video recorder. In step 1512, it is determined whether the program was a recording playback. If the watched program event was a recording playback, step 1514 adjusts the count or value associated with the watched program downward. In step 1512, if the event was not a recording playback, step 1516 determines if the event was performed on the same day of the week. If the event was performed on the same day of the week, step 1518 adjusts the count upward. After step 1518, step 1520 is performed. Step 1520 is also performed after step 1516 in which the event is now performed on the same day of the week. In step 1520 it is determined whether the watched program event was greater than X days ago. If the watched program event is greater than X days ago, then the count may be adjusted downward by an adjustment factor in step 1522. It should be noted that the adjustment in step 1522 may be optional.

After step 1522 and when the watched program event is not greater than X days ago, step 1524 is performed. In step 1524, the program content from the same series is grouped together using the content identifier, content identifier type and/or the primary identifier or other indicator of series. As mentioned above, the content identifier may have a series identifier incorporated therein. In step 1526, the weighted count values for each program in the group are summed together. The highest count values for a series having more than Y total programs, is generated. Thus, a timeslot series profile list having series that includes a type of identifier such as a content identifier, a content type and a primary identifier is formed. The highest priority of content may be at the top of the list. It should be noted that if two or more series have the same total count value, the priority may be determined based on the position of the series as specified in the prioritizer. This same total weighted count value may also be prioritized by the most recently viewed series content. It should also be noted that the time series profile is generated if the series generated is greater than two total programs. As long as there is more than two total programs within a series that have been watched, the timeslot profile series is generated in step 1530.

Figure 16:
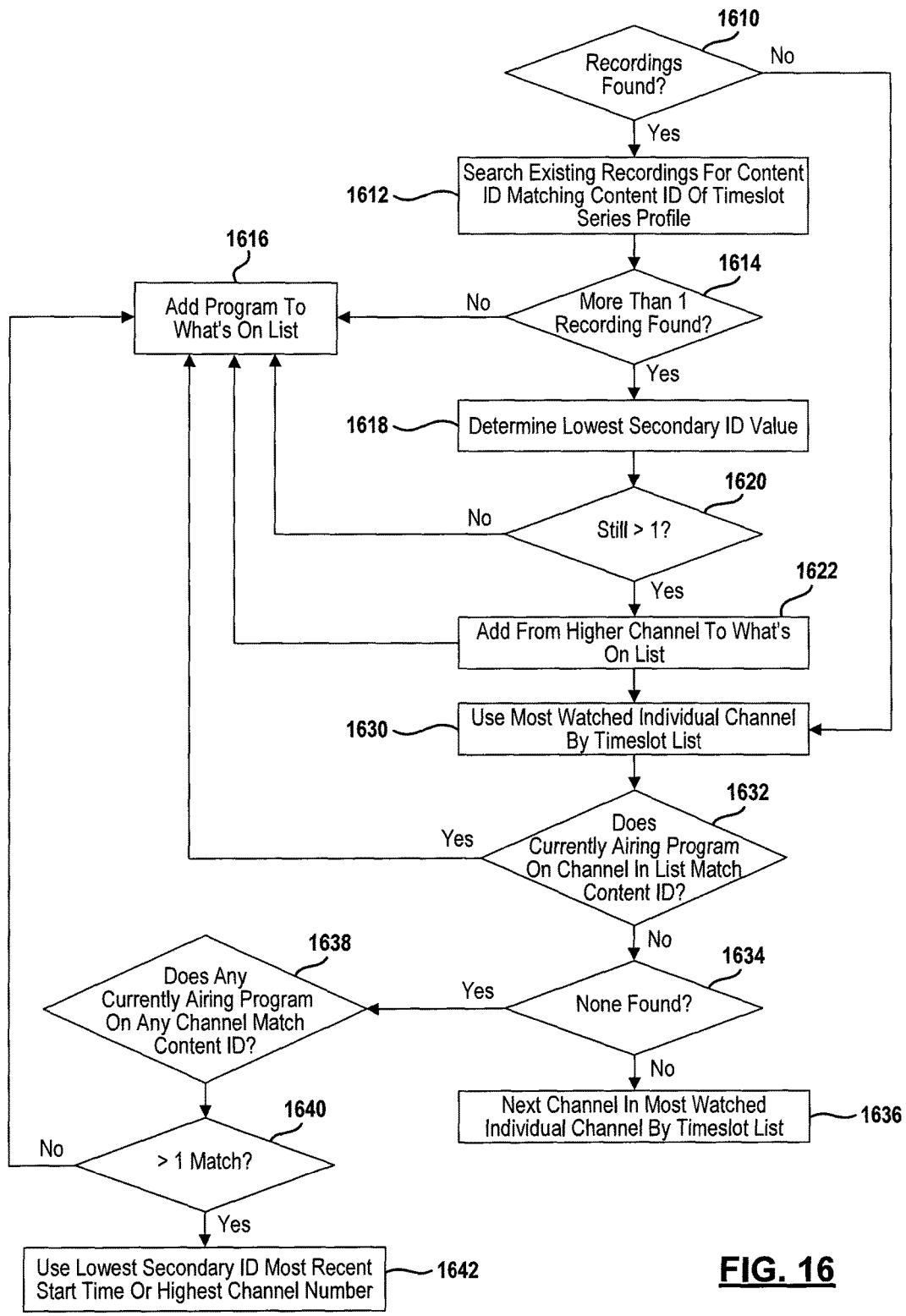
FIG. 16 is a flowchart of a method for generating the timeslot series profile match.

Referring now to FIG. 16, a method for determining a timeslot series profile match is set forth. The timeslot series profile match attempts to match currently airing programs or existing recordings to the previously generated timeslot series profile from FIG. 15. In step 1610, if recordings are found in the system, step 1612 is performed. Step 1612 searches existing recordings for the content identifier matching the content identifier of the first content in the timeslot series profile. In step 1614, it is determined if more than one recording is found. If not more than one recording is found, then the program content is added to the What's On list. The title, content identifier or any other type of identifier may be added to the What's On list in step 1616.

Referring back to step 1614, when more than one recording is found, step 1618 attempts to select one of the recordings. In step 1618, the content identifier string may be used. In this specific example, the recording with the lowest secondary ID value which, in the present example, is the fourth number in the content identifier string is used in the determination. The recording with the lowest secondary identifier is used. In step 1620, if there is not greater than one value, the lowest secondary ID value is added to the list in step 1616. If there is still greater than one recording, step 1622 adds the content from the higher channel to the What's On list. Of course, steps 1618 and 1622 are arbitrary ways for resolving the conflict in the list.

If no recordings were found in step 1610, step 1630 is performed. In this case, the most watched channels by timeslot determined in FIG. 13 is utilized. In step 1632, it is determined whether the currently airing program on that channel has a content identifier matching the first three values as those in the content identifier for the first series in the timeslot profile. If it does, step 1616 adds the currently airing program to the What's On list. In step 1632, if the currently airing program does not match What's On the timeslot profile in step 1634, the next channel in the most watched channels list is used in step 1636. After step 1636, step 1632 is repeated.

Referring back to step 1634, when the currently airing program does match the timeslot profile, it is determined whether the currently airing program on any channel matches the content identifier from the list in step 1638. After step 1638, if more than one match is not found in step 1640, step 1616 adds the currently airing program to the What's On list. In step 1640, if more than one match is found, the secondary identifier or the most recent start time or the highest channel number may be used to resolve the conflict in step 1642. This step may perform steps similar to steps 1618-1622 described above.

Figure 17:
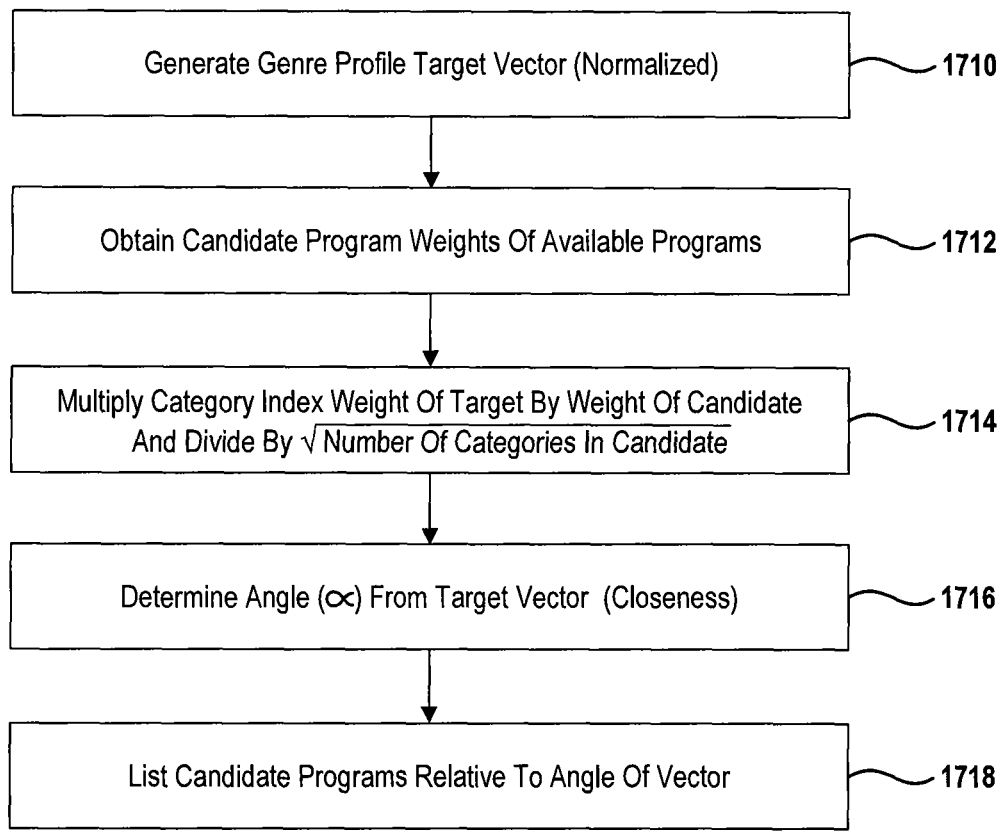
FIG. 17 is a flowchart of a method for generating a genre match.
Figures 18, 19, 20:
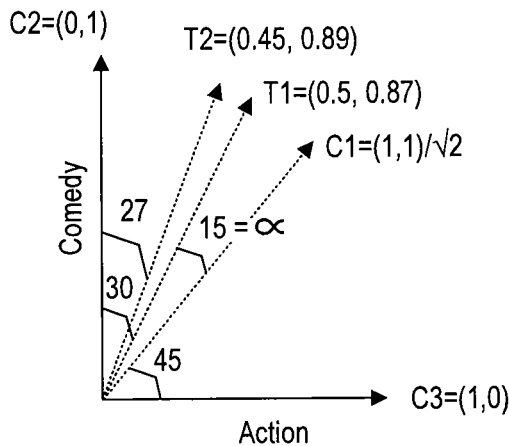
FIG. 18 is a vector representation of a genre match example.
FIG. 19 is a table corresponding to the genre match algorithm for the example of FIG. 18.
FIG. 20 is a table illustrating the adjusting of genre weights in response to a watched program event.

Referring now to FIGS. 17, 18 and 19, some of the above-mentioned methods refer to genre-matching. In FIG. 17, genre-matching is described in further detail. Genre-matching uses category weighting to represent a user's taste based upon their previously watched programs. In this method, the recommendation engine ranks programs by applying a calculation to each candidate program and returning the programs by priority based on the value returned for the calculations. The programs are then ranked highest to lowest based on the calculation of each value for each program. In general, the calculation is derived against the program genres from the APG object category description. The calculation adds a weight for each category index found in the candidate program and the sum represents the program's cosine similarity with the user's genre profile. In step 1710, a genre profile target vector is determined. The genre profile target vector is learned over time based on watched program events. The genre profile target vector may be adjusted on the fly as new watched program events occur. A genre profile target vector may be adjusted for all watched programs or a separate target vector that applies each time slot may be adjusted only when programs are watched in the time-slot. In FIG. 18, a simplified two-dimensional representation of comedy and action is illustrated. However, in an actual implementation, multiple vectors with multiple characteristics may be used. In this example, the target vector T1 is a unit vector which equals (0.5, 0.87) as its components. The target vector T1 is compared to a candidate program. The categories of the candidate program are obtained in step 1712. In FIG. 18, vector C1 represents action, comedy and vector C2 represents comedy, while vector C3 represents action. Each candidate program vector is a unit vector having category weights equal the inverse square root of the number of categories.

In step 1714 the cosine similarity is calculated. The cosine similarity is a measure of the closeness of a candidate program vector to the genre profile target vector. The dot product between the candidate unit vector and the target unit vector is equal to the cosine of the angle between these vectors. The dot product is calculated by adding the category weights of the target vector for each category in the candidate program. The sum of weights is divided by the square root of the number of categories. This genre match calculation is illustrated in FIG. 19. In FIG. 19, a table having category vectors in the first column, action in the second column, comedy in the third column, and cosine similarity is set forth. The target vector T1 has a value of 0.5 for action and 0.87 for comedy. It should be noted that these values represent a normalized unit vector. Candidate C1 has an action value of 1 over the square root of 2 and a comedy value of 1 over the square root of 2. Candidate C2 has an action value of 0 and a comedy value of 1 and candidate C3 has an action value of 1 and a comedy value of 0. Thus, the cosine similarity of each is 1, 0.97, 0.87 and 0.5 respectively. The angle of the cosine is in parentheses in the cosine similarity column. The closest vector will have the highest cosine value and thus the second row candidate C1 has the lowest angle and thus is the most similar. Essentially, the cosine similarity represents the closeness of the vectors. The actual angle need not be determined since the closest to the number 1 is the closest in cosine similarity. The cosine between the two unit vectors of the target T1 and C1, C2 and C3 is derived from the dot product of the values in the vectors.

In FIG. 17, step 1716 determines the angle from the target vector. However, as mentioned above, the closeness of the target vector to a candidate vector is determined by the cosine values and may not require the determination of the actual angle. In step 1718, the list of candidate programs relative to the angle of the vector or the closeness of the target vector is set forth.

Figure 21:
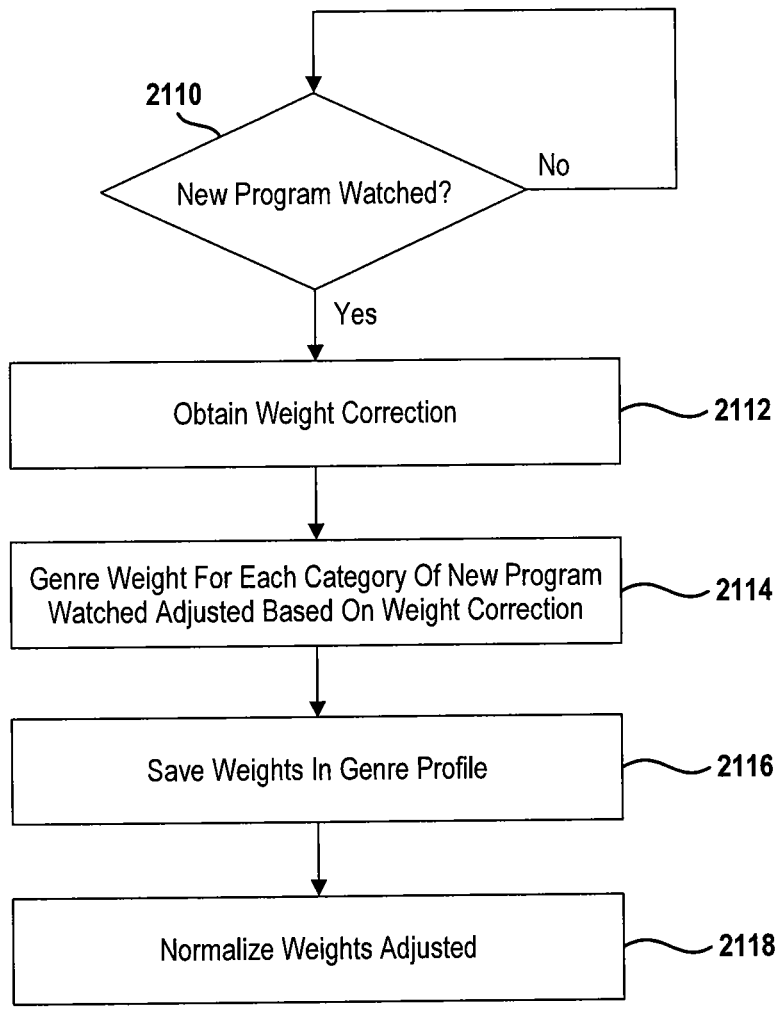
FIG. 21 is a flowchart of a method for adjusting genre weights in response to a watched program event.

Referring now to FIGS. 18, 20 and 21, the correction value may be obtained when a new program is watched in 2110, a weight correction of target vector T1 illustrated in FIG. 18 is obtained. The new target vector is target vector T2. The table illustrated in FIG. 20 illustrates an example target vector with various genre weights in four different categories, with initial weights 0.13, 0.67, 0.72 and 0.12 respectively. If a program is viewed which has only categories with category index 1, 2 and 4, but not 3, the genre match result of the viewed program is the sum of the weights for all existing categories in the program divided by the square root of the total number of categories. In this case, if categories 1, 2 and 4 are used, the result is 0.13 plus 0.67 plus 0.12 divided by the square root of 3 which equals 0.53. The value 0.53 is a genre match value.

The weight in the target vector is adjusted to new weight to incorporate feedback from recently watched programs. The new weight equals the old genre weight plus the step size divided by the square root of the number of categories in the program multiplied by the normalization value minus the genre match calculation of the program. For example, if the step size is 1, the weight adjustment is 1 minus 0.53 divided by the square root of 3. The resulting value 0.27 is the adjustment for the genre weights corresponding to the viewed program. Thus, if the program having the weights illustrated in FIG. 20 were used, the new category indexes of 1, 2 and 4 are adjusted to 0.4, 0.94 and 0.39, while category 3 remains 0.72. The adjusted weights are also shown in FIG. 20. The length equals the square root of the sum the genre weights squared. The new length equals 1.31. One divided by the new length is then multiplied by each category index weight to obtain the new normalized weights. The new target vector comprising the normalized weights for the four categories changes to 0.31, 0.72, 0.55 and 0.30, respectively.

Referring back to FIG. 21, the genre weights for each of the category of the new program watched is adjusted based upon the weight correction as described above in step 2114. In step 2116, the weights in the genre profile are adjusted. The weights are then normalized by dividing by the length as described above in step 2118. The genre match calculation described above corresponds to a cosine similarity error measurement, and the weight adjustment corresponds to a stochastic gradient descent, but many other genre matching or weight adjustment algorithms may be used.

Referring now to FIG. 22, a use case is presented in which the set top box or user device has stored the viewing history illustrated in the viewer tracking log over the last 36 days. In this example, a viewer that is using the user device asks for recommendations at a time when he normally watches a particular series. As can be seen in the figure, a title column, a content identifier column, a channel column, a date column which gives the relative date of the content, a timeslot column and a watched time column are illustrated. Each of the titles thus has each one of the different types of data in each of the columns associated therewith. Also in the following example it is presumed that the recommendation request is performed at 7:12 p.m.

Referring now to also FIG. 23, the program guide includes the data in the table. The program guide data may include the title, a content identifier, a channel, a date, start time and duration. Each of the titles has each of the data from each of the columns associated therewith. Data has also been provided for related episodes which includes the Simpsons episode content identifier 11 20 8 which is linked to the Family Guy episode 11 46 17. In the following case, the timeslot to be used is the 7:00 p.m.-7:30 p.m. timeslot. By applying the above methods, the timeslot series profile returns Seinfeld and the Simpsons. The series are identified in this Example as the first four digits being the same. (Simpsons, 1 1 20, Seinfeld 1 1 10). The viewer preferred channels are 217, 216, and 705. The first time slot profile series matches an episode currently airing on a channel list in the most watched channels by time slot list so that Seinfeld on channel 217 at 7:00 p.m. is added to the What's On results list. The second timeslot profile series does not match an episode on any channels in the most watched channels by time slot list but; does match a currently airing program on channel 215. Therefore, the Simpsons on channel 215 at 7:00 p.m. is added to the What's On results list.

The currently airing program on the second channel in the most watched channels in the timeslot list has not been added so, based on a genre match ranking, Futurama on channel 216 at 7:00 p.m. is added to the What's On results list.

The currently airing program on channel 705 is the only other program not added yet. The programs on the other two channels have already been added. Therefore, golf on channel 729 at 6:00 p.m. is added to the What's On results list.

For the You Might Like list, the data link for the Simpsons refers to the Family Guy on channel 306 so that the Family Guy is added to the You Might Like results list. All upcoming programs for up to three hours may be obtained from the related channels list generated from the viewer-preferred channels list. Presuming the following match the genre matched test, there are only three shows that have not passed or been added to the What's On list or the You Might Like list. These are Nightly News on channel 217 at 7:30 p.m., Futurama on channel 216 at 7:30 p.m. and Sports Center on channel 729 at 9:00 p.m. These results may be sorted chronologically so that nightly news, Futurama, Sports Center and The Family Guy are presented in that order. A screen display having posters or thumbnails and/or alphanumeric characters may be used for presenting the What's On and You Might Like lists.

Referring now to FIG. 24, the recommendations for a new set top box do not take into consideration previously watched programming. In this case, a recommendation is requested by the user at 7:12 p.m. The data in FIG. 24 is within the program guide. In this example, it is also presumed that the Simpsons episode with a content identifier equal to 1 1 20 8 links to The Family Guy episode content identifier equals 1 1 46 17. It is also presumed that no daily editorial lists are defined. The recommended channels list includes in this order: channel 216, channel 217, channel 215, channel 710, channel 340, channel 450, channel 729, channel 1007, and channel 1005. Five programs are selected that correspond to the programs on the recommended channels list. In the proper order, Futurama on channel 216, Seinfeld on channel 217, the Simpsons on channel 215, Psyche on channel 710 and golf on channel 729 are returned. The genre match algorithm is applied to each program and assuming that they all pass except for Seinfeld on channel 217, the What's On list will result in Futurama, the Simpsons, Psyche and golf all being returned in that order.

The You Might Like list uses a related data link which, as mentioned above, links the Simpsons to The Family Guy. The related channels list ultimately gathers only three programs because they are the only current and future programs left airing on any channel of the recommended channels list. The following three programs, Seinfeld, House and Sports Center are added to the You Might Like list. Chronologically, the list may be sorted as Seinfeld, House, Sports Center and The Family Guy.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   determining a timeslot;
   tracking viewer events within a user device to form a viewer tracking log;
   generating a timeslot viewing profile for the timeslot based on the viewer tracking log, the timeslot viewing profile including television programs watched previously at the user device during the timeslot, said timeslot viewing profile comprises a timeslot series profile determined by obtaining a watched program event having a count associated therewith and adjusting the count based on a type of watched program event adjusting the count for the watched program event downward when the watched program is a recording playback and adjusting the count for the watched program event downward when the watched event is older than a predetermined time;
   comparing the television programs of the timeslot viewing profile with television programs that are available during the timeslot;
   generating a first content recommendation list comprising television programs that are available during the timeslot and that are included in the timeslot viewing profile of the timeslot;
   communicating content identifiers for related content to the user device from external to the user device, the content identifiers for related content identifying content that is available during the timeslot and that is related to the television programs of the first content recommendation list based on at least one of content from a related channel group not in the first content recommendation list, a related television series group not in the first content recommendation list, or an editorial list for the timeslot not in the first content recommendation list; and
   based on the content identifiers for related content, generating a second content recommendation list comprising content that is available during the timeslot and that is different from the first content recommendation list.

2. A method as recited in claim 1 wherein determining a timeslot comprises determining a half hour timeslot.

3. A method as recited in claim 1 wherein determining a timeslot comprises determining a half hour timeslot for live content and one hour timeslot for recorded content.

4. A method as recited in claim 1 wherein tracking viewer events comprises tracking viewer events to form the viewer tracking log in response to tuning to a live event.

5. A method as recited in claim 1 wherein tracking viewer events comprises tracking viewer events to form the viewer tracking log in response to watching a program.

6. A method as recited in claim 1 wherein tracking viewer events comprises tracking viewer events to form the viewer tracking log in response to tuning to a live event for a greater than a predetermined amount of time.

7. A method as recited in claim 1 wherein tracking viewer events comprises tracking viewer events to form the viewer tracking log comprising a channel identifier, a series identifier and a program identifier.

8. A method as recited in claim 1 wherein tracking viewer events comprises tracking viewer events to form the viewer tracking log in response to playback of a recording stored in the user device.

9. A method as recited in claim 1 wherein tracking viewer events comprises tracking viewer events to form the viewer tracking log comprising trickplay events.

10. A method as recited in claim 1 wherein tracking viewer events comprises tracking viewer events to form the viewer tracking log comprising deleting recording events.

11. A method as recited in claim 1 wherein tracking viewer events comprises tracking viewer events to form the viewer tracking log comprising events occurring longer than a predetermined amount of time from a current time.

12. A method as recited in claim 1 wherein adjusting the count comprises adjusting the count for the watched program event upward when the watched event is on a same day of a week as a current time.

13. A method as recited in claim 1 further comprising summing the count of a plurality of watched program events for a same program series and wherein generating a timeslot series profile comprises generating a timeslot series profile having a plurality of program series prioritized according to count.

14. A method as recited in claim 13 further comprising generating a most watched channels per timeslot list, comparing a first content identifier of a currently airing program on a channel in the most watched channels per timeslot list with the timeslot series profile and adding the currently airing program when the content identifier is the same as a second content identifier of a program in the timeslot series profile.

15. A method as recited in claim 13 further comprising comparing a first content identifier of a currently airing program on an available channel with the timeslot series profile and adding the currently airing program when the content identifier is the same as a second content identifier of a program in the timeslot series profile.

16. A method as recited in claim 1 wherein comparing the television programs of the timeslot viewing profile with television programs that are available during the timeslot comprises comparing the television programs of the timeslot viewing profile with television programs that are available during the timeslot and that are related to programs regularly watched by the viewer during the timeslot.

17. A method as recited in claim 1 wherein comparing the television programs of the timeslot viewing profile with television programs that are available during the timeslot comprises comparing the television programs of the timeslot viewing profile with future programs that are related to programs that are regularly watched by the viewer.

18. A method as recited in claim 1 wherein comparing the television programs of the timeslot viewing profile with the television programs that are available during the timeslot comprises comparing the television programs of the timeslot viewing profile with recorded content and live content.

19. A method as recited in claim 1 wherein generating a first content recommendation list comprises generating the first content recommendation list including live content and content recorded in a memory of the user device.

20. A method as recited in claim 1 wherein generating a first content recommendation list comprises generating the first content recommendation list excluding recently viewed programs.

21. A method as recited in claim 1 wherein generating a first content recommendation list comprises generating the first content recommendation list by filtering available content.

22. A method as recited in claim 1 further comprising generating a timeslot viewer preferred channels list comprising a most watched channels per timeslot list.

23. A method as recited in claim 1 wherein generating a first content recommendation list comprises selecting a current program or future program from a most watched channels per timeslot list.

24. A method as recited in claim 1 wherein generating a first content recommendation list comprises generating the first content recommendation list in response to a timeslot viewer preferred channels list having at least a first channel.

25. A method as recited in claim 1 wherein generating a first content recommendation list comprises determining a first television program television programs available during the timeslot and a second television program available during the timeslot and selecting one of the first and second television programs with a closest genre match.

26. A method as recited in claim 25 wherein selecting one of the first and second television programs with a closest genre match comprises genre matching the first television program and genre matching the second television program to find the closest genre match.

27. A method as recited in claim 26 wherein genre matching comprises determining a genre profile target based on viewing history.

28. A method as recited in claim 27 further comprising adjusting the genre profile target based on a viewed program.

29. A method as recited in claim 27 wherein genre matching comprises comparing the genre profile target and a program genre value.

30. A method as recited in claim 26 wherein genre matching comprises comparing a genre profile target vector and a current program genre vector.

31. A method as recited in claim 30 wherein comparing a genre profile target vector and a current program genre vector comprises determining a dot product of the current program genre vector and the genre profile target vector.

32. A method as recited in claim 1 wherein generating a first content recommendation list comprises generating a first content recommendation list including content normally viewed in the timeslot.

33. A method as recited in claim 1 wherein generating the second content recommendation list comprises generating a second content recommendation list including content that is different from content normally viewed in the timeslot.

34. A method as recited in claim 1 further comprising displaying at least a portion of the first content recommendation list and at least a portion of the second content recommendation list simultaneously on a display associated with the user device.

35. A method as recited in claim 1 wherein the generating a second content recommendation list comprises determining related programs from a data source external to a head end, determining the content identifiers for related content based on the related programs, and communicating the content identifiers for related content from the head end to the user device.

36. A method as recited in claim 1 further comprising generating a most watched channels per timeslot list comprising a plurality of channels.

37. A method as recited in claim 36 further comprising receiving a daily editorial program content list having a first editorial content, and adding the first editorial content to the second content recommendation list based on comparing with the most watched channels per timeslot list.

38. A method as recited in claim 1 wherein generating the second content recommendation list comprises generating the second content recommendation list in response to a timeslot viewer preferred channels list.

39. A method as recited in claim 1 further comprising generating the second content recommendation list based on a related channels list.

40. A method as recited in claim 39 further comprising generating the related channels list in response to a timeslot viewer preferred channels list.

41. A method as recited in claim 39 further comprising genre matching programs on the related channels list to a genre profile and adding a program to the second recommendation list in response to the genre matching.

42. A method as recited in claim 1 wherein determining a timeslot comprises determining a current time, establishing a fixed time period for the timeslot having an end time;
when the current time is greater that a predetermined time from the end time of the timeslot corresponds to a current timeslot before the end time; and
when the current time is not greater than a predetermined time from the end time, the timeslot corresponds to a next timeslot after the end time.

43. A user device comprising:
a viewer tracking module that tracks viewer events to form a viewer tracking log; and,
a recommendation module that determines a timeslot and generates a timeslot viewing profile for the timeslot based on the viewer tracking log, the timeslot viewing profile including television programs watched previously at the user device during the timeslot, said timeslot viewing profile comprises a timeslot series profile determined by obtaining a watched program event having a count associated therewith and adjusting the count based on a type of watched program event adjusting the count for the watched program event downward when the watched program is a recording playback and adjusting the count for the watched program event downward when the watched event is older than a predetermined time;

said recommendation module compares the television programs of the timeslot viewing profile with television programs that are available during the timeslot, generates a first content recommendation list comprising television programs that are available during the timeslot and that are included in the timeslot viewing profile of the timeslot, receives related content identifiers for related content from external to the user device, the content identifiers for related content identifying content that is available during the timeslot and that is related to the television programs of the first content recommendation list based on at least one of content from a related channel group not in the first content recommendation list, a related television series group not in the first content recommendation list, or an editorial list for the timeslot not in the first content recommendation list, and, based on the content identifiers for related content, generates a second content recommendation list comprising content that is available during the timeslot and that is different from the first content recommendation list.

44. A system as recited in claim 43 wherein the timeslot comprises a half hour timeslot.

45. A system as recited in claim 43 wherein the timeslot comprises a half hour timeslot for live content and one hour timeslot for recorded content.

46. A system as recited in claim 43 wherein the viewer tracking log comprises a live program tuning event.

47. A system as recited in claim 43 wherein the viewer tracking log comprises a program watched event.

48. A system as recited in claim 43 wherein the viewer tracking log comprises a live tuning event greater than a predetermined amount of time.

49. A system as recited in claim 43 wherein the viewer tracking log comprises a channel identifier, a series identifier and a program identifier.

50. A system as recited in claim 43 wherein the viewer tracking log comprising an event corresponding to playback of a recording stored in the user device.

51. A system as recited in claim 43 wherein the viewer tracking log comprises a trickplay event.

52. A system as recited in claim 43 wherein the viewer tracking log comprises a deleted recording event.

53. A system as recited in claim 43 wherein the viewer tracking log comprises a events occurring longer than a predetermined amount of time from a current time.

54. A system as recited in claim 43 wherein the timeslot series profile comprises a watched program event having a count associated therewith.

55. A system as recited in claim 43 wherein the recommendation module adjusts the count upward when the watched event is on a same day of a week as a current time.

56. A system as recited in claim 43 wherein the recommendation module sums the count of a plurality of watched program events for a same program series and wherein the timeslot series profile comprises a program series prioritized according to count.

57. A system as recited in claim 56 wherein the recommendation module generates a most watched channels per timeslot list, compares a first content identifier of a currently airing program on a channel in the most watched channels per timeslot list with the timeslot series profile and adds the currently airing program when the content identifier is the same as a second content identifier of a program in the timeslot series profile.

58. A system as recited in claim 56 wherein the recommendation module compares a first content identifier of a currently airing program on an available channel with the timeslot series profile and adds the currently airing program when the content identifier is the same as a second content identifier of a program in the timeslot series profile.

59. A system as recited in claim 43 wherein the recommendation module compares the timeslot viewing profile with television programs that are available during the timeslot and that are related to programs regularly watched by the viewer during the timeslot.

60. A system as recited in claim 43 wherein the recommendation module compares the timeslot viewing profile with future programs that are related to programs that are regularly watched by the viewer.

61. A system as recited in claim 43 wherein the recommendation module compares the timeslot viewing profile with recorded content and live content.

62. A system as recited in claim 43 wherein the first content recommendation list comprises live content and content recorded in a memory of the user device.

63. A system as recited in claim 43 wherein the first content recommendation list excludes recently viewed programs.

64. A system as recited in claim 43 further comprising a filter module filtering available content.

65. A system as recited in claim 43 wherein a timeslot viewing profile comprises a viewer preferred channels list comprising most watched channels per timeslot.

66. A system as recited in claim 43 wherein the recommendation module selects a current or future program from a most watched channels per timeslot list.

67. A system as recited in claim 43 wherein the recommendation module generates the first content recommendation list in response to a timeslot viewer preferred channels list having at least a first channel.

68. A system as recited in claim 67 wherein the recommendation module determines a first channel in the timeslot viewer preferred channels list and genre matches a program based on the first channel and a genre profile target.

69. A system as recited in claim 68 wherein the recommendation module genre matches by comparing a genre profile target and a current program genre value.

70. A system as recited in claim 68 wherein the recommendation module genre matches by comparing a genre profile target vector and a current program genre vector.

71. A system as recited in claim 70 wherein the recommendation module compares a genre profile target vector and a current program genre vector and determines a dot product between the current program genre vector and the genre profile target vector.

72. A system as recited in claim 43 wherein the recommendation module determines a first television program available during the timeslot and a second television program available during the timeslot and selects one of the first and second television programs with a closest genre match.

73. A system as recited in claim 43 wherein the recommendation module determines a genre profile target based on viewing history.

74. A system as recited in claim 43 wherein the recommendation module adjusts a genre profile target based on a viewed program.

75. A system as recited in claim 43 wherein the recommendation module generates a first content recommendation list including content normally viewed in the timeslot.

76. A system as recited in claim 43 wherein the recommendation module generates the second content recommendation list including content that is different from content normally viewed in the timeslot.

77. A system as recited in claim 43 wherein the recommendation module generates a first content recommendation list of content normally viewed in the timeslot and the second content recommendation list different than the first recommendation list comprising programs related to the first content recommendation list.

78. A system as recited in claim 43 wherein the recommendation module displays at least a portion of the first content recommendation list and at least a portion of the second content recommendation list simultaneously on a display associated with the user device.

79. A system as recited in claim 43 wherein the recommendation module generates the second content recommendation list by determining related programs from related data from a data source external to a head end.

80. A system as recited in claim 43 wherein the recommendation module generates a most watched channels per timeslot list comprising a plurality of channels.

81. A system as recited in claim 43 wherein a second content recommendation list comprises programs from a most watched channels per timeslot list.

82. A system as recited in claim 80 wherein the recommendation module compares a daily editorial program content list having a first editorial content with the most watched channels per timeslot list and adds the content to the second content recommendation list based on comparing.

83. A system as recited in claim 82 wherein the second content recommendation list is based on a related channels list.

84. A system as recited in claim 83 wherein the related channels list is generated in response to a timeslot viewer preferred channels list.

85. A system as recited in claim 82 wherein the recommendation module genre matches programs on the related channels list to a genre profile and adds the current program to the second content recommendation list in response to the genre matching.

86. A system as recited in claim 43 wherein the timeslot comprises current timeslot when a current time is greater that a predetermined time from an end time of the timeslot or a next timeslot when the current time is not greater than a predetermined time from the end time.

87. A method comprising:
  determining a timeslot;
  tracking viewer events within a user device to form a viewer tracking log;
  generating a timeslot viewing profile for the timeslot based on the viewer tracking log, the timeslot viewing profile including television programs watched previously at the user device during the timeslot, said timeslot viewing profile comprises a timeslot series profile determined by obtaining a watched program event having a count associated therewith and adjusting the count based on a type of watched program event adjusting the count for the watched program event downward when the watched program is a recording playback and adjusting the count for the watched program event downward when the watched event is older than a predetermined time;
  comparing the television programs of the timeslot viewing profile with television programs that are available during the timeslot;
  generating a first content recommendation list comprising television programs that are available during the timeslot and that are included in the timeslot viewing profile of the timeslot;
  communicating content identifiers for related content to the user device from external to the user device in metadata associated with content in the first recommendations list, the content identifiers for related content identifying content that is available during the timeslot and that is related to the television programs of the first content recommendation and are based on at least one of content from a related channel group not in the first content recommendation list, a related television series group not in the first content recommendation list, or an editorial list for the timeslot not in the first content recommendation list; and
  based on the content identifiers for related content, generating a second content recommendation list comprising content that is available during the timeslot and that is different from the first content recommendation list.

* * * * *